US012650625B2

(12) United States Patent (10) Patent No.: US 12,650,625 B2
Zhuang et al. (45) Date of Patent: Jun. 9, 2026

(54) PHOTO SPACER AND COLUMN SPACER DESIGN FOR LCD DISPLAY

(71) Applicant: Meta Platforms Technologies, LLC, Menlo Park, CA (US)

(72) Inventors: Li Zhuang, Bellevue, WA (US); Rungrot Kitsomboonloha, Los Gatos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 232 days.

(21) Appl. No.: 18/505,894

(22) Filed: Nov. 9, 2023

(65) Prior Publication Data

US 2025/0334837 A1 Oct. 30, 2025

Related U.S. Application Data

(60) Provisional application No. 63/385,458, filed on Nov. 30, 2022.

(51) Int. Cl.
*G02F 1/1339* (2006.01)
*G02B 27/01* (2006.01)

(52) U.S. Cl.
CPC ...... *G02F 1/13394* (2013.01); *G02F 1/13396* (2021.01); *G02B 27/0172* (2013.01); *G02B 2027/0178* (2013.01)

(58) Field of Classification Search
CPC ............. G02F 1/13394; G02F 1/13396; G02B 27/0172
See application file for complete search history.

(56) References Cited

U.S. PATENT DOCUMENTS

2002/0089636 A1* 7/2002 Kang .................. G02F 1/13394
349/156
2015/0253607 A1* 9/2015 Cho ....................... G02F 1/1337
349/110
2021/0050307 A1* 2/2021 Tsai ........................ H01L 21/74

* cited by examiner

*Primary Examiner* — Lucy P Chien
(74) *Attorney, Agent, or Firm* — Greenberg Traurig, LLP

(57) ABSTRACT

A liquid crystal display (LCD) of a near-eye display comprises a first substrate, a second substrate, a plurality of photo spacers formed on the second substrate, a plurality of column spacers formed on the first substrate, and a liquid crystal material in regions between the first substrate and the second substrate. In some embodiments, each column spacer of the plurality of column spacers includes two parts that form a recess for receiving a respective photo spacer of the plurality of photo spacers. In some embodiments, each photo spacer of the plurality of photo spacers includes two parts that form a recess for receiving a respective column spacer of the plurality of column spacers. In some embodiments, the plurality of column spacers includes different types of column spacers with different or same heights, and the plurality of photo spacers includes different types of photo spacers with different or same heights.

20 Claims, 16 Drawing Sheets

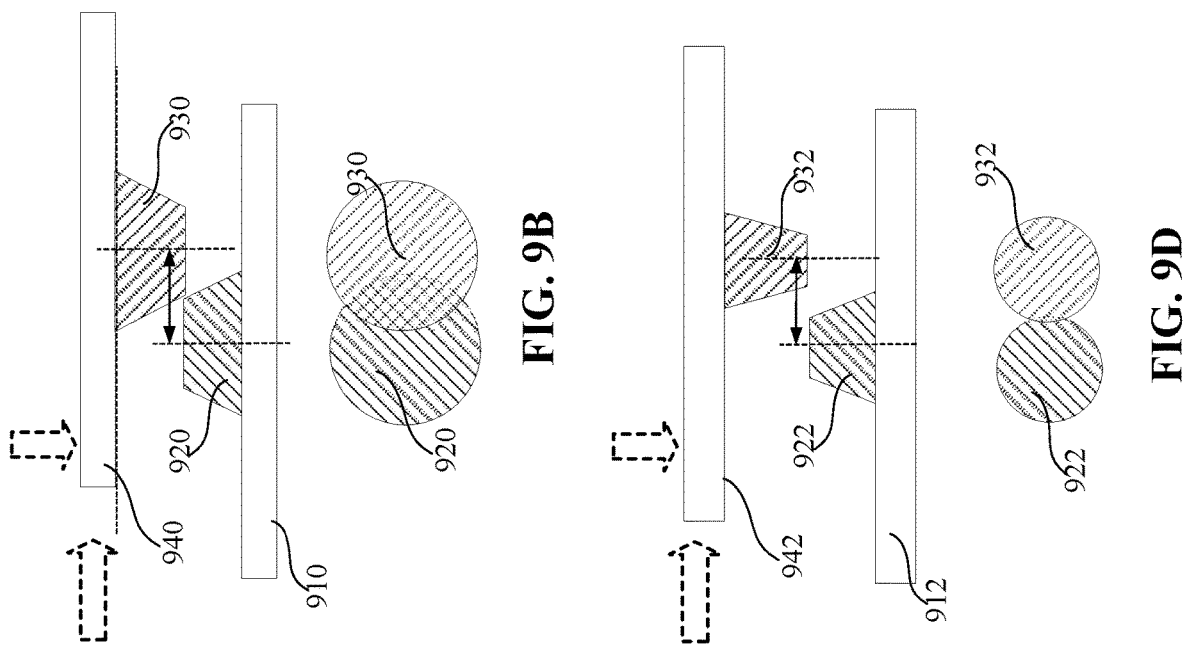
FIG. 9B
FIG. 9D
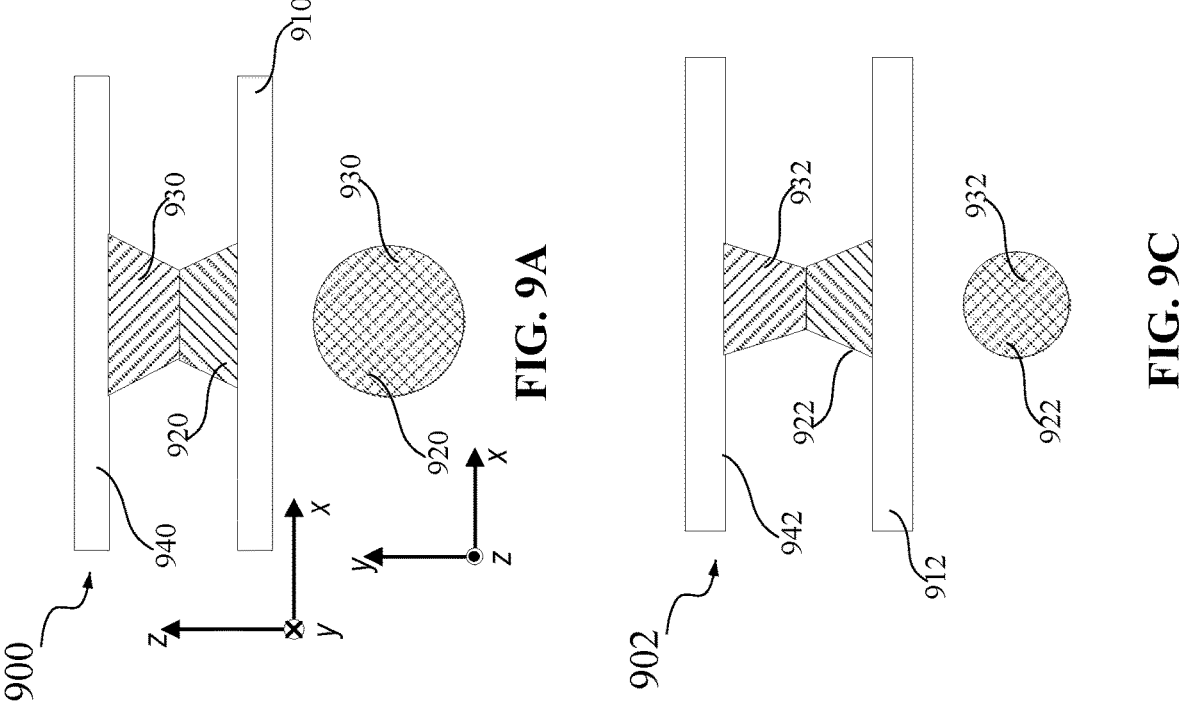
FIG. 9A
FIG. 9C

PHOTO SPACER AND COLUMN SPACER DESIGN FOR LCD DISPLAY

CROSS-REFERENCE TO RELATED APPLICATIONS

This application claims the benefit of and priority to U.S. Provisional Application No. 63/385,458, filed Nov. 30, 2022, entitled "PHOTO SPACER AND COLUMN SPACER DESIGN FOR LCD DISPLAY," which is herein incorporated by reference in its entirety for all purposes.

BACKGROUND

An artificial reality system, such as a head-mounted display (HMD) or heads-up display (HUD) system, generally includes a near-eye display system in the form of a headset or a pair of glasses and configured to present content to a user via an electronic or optic display within, for example, about 10-20 mm in front of the user's eyes. The near-eye display system may display virtual objects or combine images of real objects with virtual objects, as in virtual reality (VR), augmented reality (AR), or mixed reality (MR) applications.

SUMMARY

This disclosure relates generally to liquid crystal displays (LCDs) for near-eye display. More specifically, and without limitation, techniques disclosed herein relate to photo spacer (PS) and column spacer (CS) design for reducing PS mura issues in LCD displays. Various inventive embodiments are described herein, including devices, systems, methods, structures, materials, processes, and the like.

According to certain embodiments, a liquid crystal display (LCD) cell may include a first substrate; a second substrate; a plurality of photo spacers formed on the second substrate; a plurality of column spacers formed on the first substrate, each column spacer of the plurality of column spacers including two parts that form a recess for receiving a respective photo spacer of the plurality of photo spacers; and a liquid crystal material in regions between the first substrate and the second substrate.

According to certain embodiments, an LCD cell may include a first substrate; a second substrate; a plurality of column spacers formed on the first substrate; and a plurality of photo spacers formed on the second substrate, each photo spacer of the plurality of photo spacers including two parts that form a recess for receiving a respective column spacer of the plurality of column spacers; and a liquid crystal material in regions between the first substrate and the second substrate.

According to certain embodiments, an LCD cell may include a first substrate, a second substrate, a plurality of photo spacers formed on the second substrate, a plurality of column spacers formed on the first substrate, and a liquid crystal material in regions between the first substrate and the second substrate. The plurality of column spacers may include a first set of column spacers characterized by a first height, and at least one of: a second set of column spacers characterized by a second height equal to or greater than the first height; or a third set of column spacers characterized by a third height equal to or lower than the first height.

According to certain embodiments, a liquid crystal display may include a backlight unit configured to emit visible light; a first polarizer configured to polarize the visible light from the backlight unit; the LCD cell disclosed herein for modulating the polarized visible light; and a second polarizer configured to filter the visible light modulated by the LCD cell. According to certain embodiments, a near-eye display may include the liquid crystal display and display optics configured to project images generated by the liquid crystal display to a user's eye.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 9A illustrates an example of an LCD cell with large photo spacers and column spacers.

FIG. 9B illustrates an example of lateral displacement between a photo spacer and a column spacer in the LCD cell of FIG. 9A.

FIG. 9C illustrates an example of an LCD cell with small photo spacers and column spacers.

FIG. 9D illustrates an example of lateral displacement between a photo spacer and a column spacer in the LCD cell of FIG. 9C.

Figure 1:
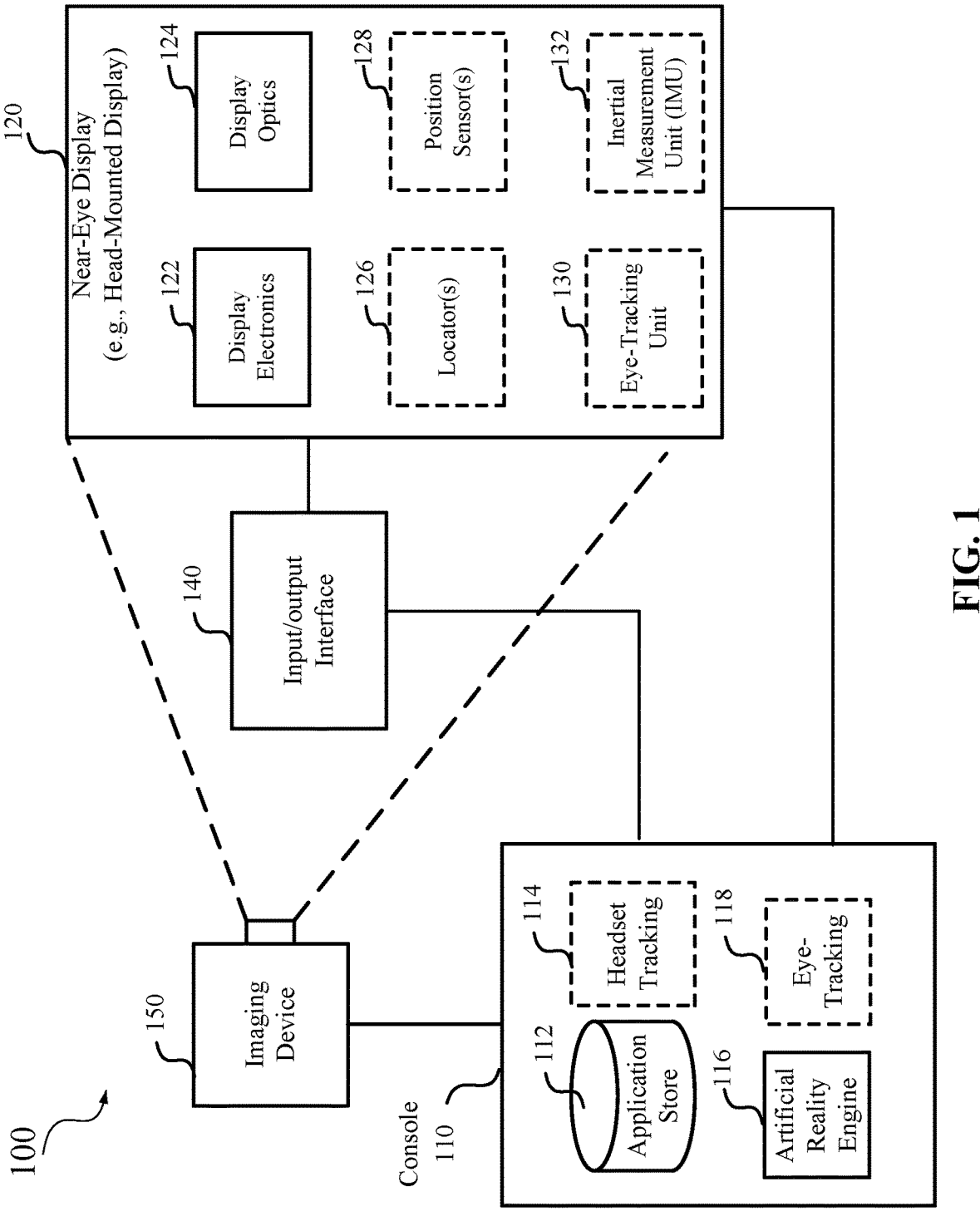
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to liquid crystal displays (LCDs) for near-eye display. More specifically, and without limitation, techniques disclosed herein relate to photo spacer (PS) and column spacer (CS) design for reducing PS mura issues in LCD displays. Various inventive embodiments are described herein, including devices, systems, methods, structures, materials, processes, and the like.

In LCD displays, liquid crystal cells may be sandwiched by a bottom substrate and a top substrate. For example, in some implementations, the bottom substrate may include thin-film transistor (TFT) circuits formed on a glass substrate for controlling the liquid crystal cell, whereas the top substrate may include a common electrode and color filters formed on another glass substrate. In some implementations, the bottom substrate may include both TFT circuits and color filters formed on a glass substrate (referred to as color filter on array (COA)), whereas the top substrate may include a common electrode and a black matrix formed on another glass substrate. In some implementations, pixel electrodes and the common electrode may both be formed on the bottom substrate, for example, in fringe field switching (FFS) mode liquid crystal display, whereas the top substrate may include a black matrix and an overcoat layer formed on another glass substrate. Spacers may be used to separate the bottom substrate and the top substrate and create a gap between the two substrates such that a liquid crystal material may be filled in the gap. For example, the bottom substrate may include column spacers formed thereon, and the top substrate may include photo spacers formed thereon. When the top substrate and the bottom substrate are assembled to form an LCD cell or LCD panel, the photo spacers may land on the corresponding column spacers to achieve the desired separation between the top substrate and the bottom substrate.

When an LCD cell is bent, pressed, or otherwise deformed, the substrate deflection or deformation may cause the shift of the photo spacers with respect to the column spacers, such that some photo spacers may no longer sit on the corresponding column spacers. When the shift is larger than the size of a photo spacer or a column spacer, the photo spacer may touch the bottom substrate, and may cause damages to surrounding regions or otherwise affect the light transmission/modulation in the surrounding regions. As such, light transmission or illuminance in some areas of the LCD cell may be different or anomalous from the neighboring areas, which may be referred to as mura (blemish in Japanese) failures (or defects) or patterned brightness non-uniformity (BNU). Mura defects may have irregular shapes and may result in low contrast or otherwise affect the quality of the displayed images. In LCD panels with higher resolution, the pixels may be small and the spacers may be small as well. Therefore, a small displacement may cause the disengagement of the photo spacers and the column spacers and cause mura defects. As such, mura defects may become more severe in LCD panels with higher resolution.

According to certain embodiments disclosed herein, a column spacer (CS) (or photo spacer (PS)) of an LCD cell may be split into two parts with tapered or rounded corners to create a pocket or recess with outwardly tilted sidewalls for receiving a tapered photo spacer (or column spacer). The engagement between the PS and the CS through the pocket or recess may restrict the relative displacement between the PS and the CS, and thus may prevent the PS from disengaging with the CS and contacting the bottom substrate to cause damages or otherwise affect the light transmission/modulation in the surrounding regions. In some embodiments, the slot or gap between the two parts of a split CS (or PS) may be rectangular, which may limit the relative movement between the PS and the CS in one direction while allowing relative movement between the PS and the CS in a perpendicular direction. In some embodiments, the slot or gap between the two portions of a split CS (or PS) may be slanted, which may allow some amount of relative lateral movement between the PS and the CS along the slanted direction. The split column spacers may be arranged to have different orientations, according to a pattern or randomly, to restrict the relative lateral movement between the PS and the CS in all directions in a lateral plane. As such, mura defects due to the displacement of the spacers may be reduced or avoided.

According to certain embodiments disclosed herein, the column spacers and/or photo spacers in an LCD cell may include different types of column spacers and/or photo spacers. For example, the column spacers may include main column spacers that may engage with corresponding photo spacer as in some existing LCD display panels, and may also include sub-column spacers and safeguard column spacers. The height of the sub-column spacers may be higher than the heights of the main column spacers and the safeguard column spacers, and may not have corresponding photo spacers. The sub-column spacers may prevent the top substrate from contacting the bottom substrate and maintain a minimum distance between the bottom substrate and the top substrate. The safeguard column spacers may be slanted and tapered, and may be separate by a small distance from corresponding safeguard photo spacers that may be slanted (e.g., in the same direction as the corresponding safeguard column spacers) and tapered (e.g., in opposite direction with respect to the corresponding safeguard column spacers). The slanted safeguard column spacers and corresponding safeguard photo spacers may allow the lateral movement between the column spacers and the photo spacers along the slanted directions. The safeguard column spacers and corresponding safeguard photo spacers may be slanted in different directions in different regions of the LCD cell, so as to restrict or limit large displacement of the spacers in all directions in a lateral plane. The safeguard column spacers and corresponding safeguard photo spacers may allow some amounts of relative vertical and lateral movement between the safeguard column spacers and corresponding safeguard photo spacers along the tapering direction when there is lateral displacement between the top substrate and the bottom substrate, thereby increasing the distance between the top substrate and the bottom substrate and preventing the photo spacers from contacting the bottom substrate. As such, mura defects due to the displacement of the spacers may be reduced or avoided.

The LCD devices described herein may be used in conjunction with various technologies, such as an artificial reality system. An artificial reality system, such as a head-mounted display (HMD) or heads-up display (HUD) system, generally includes a display configured to present artificial images that depict objects in a virtual environment. The display may present virtual objects or combine images of real objects with virtual objects, as in virtual reality (VR), augmented reality (AR), or mixed reality (MR) applications. For example, in an AR system, a user may view both displayed images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (μLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an antireflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be a light-emitting diode (LED), a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 12 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit.

Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 120 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking subsystem 114, an artificial reality engine 116, and an eye-tracking subsystem 118. Some embodiments of console 110 may include different or additional devices or subsystems than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the devices or subsystems of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking subsystem 114 may track movements of near-eye display 120 using slow calibration information from external imaging device 150. For example, headset tracking subsystem 114 may determine positions of a reference point of near-eye display 120 using observed locators from the slow calibration information and a model of near-eye display 120. Headset tracking subsystem 114 may also determine positions of a reference point of near-eye display 120 using position information from the fast calibration information. Additionally, in some embodiments, headset tracking subsystem 114 may use portions of the fast calibration information, the slow calibration information, or any combination thereof, to predict a future location of near-eye display 120. Headset tracking subsystem 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking subsystem 114. Artificial reality engine 116 may also receive estimated eye position and orientation information from eye-tracking subsystem 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking subsystem 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking subsystem 118 to more accurately determine the eye's orientation.

Figure 2:
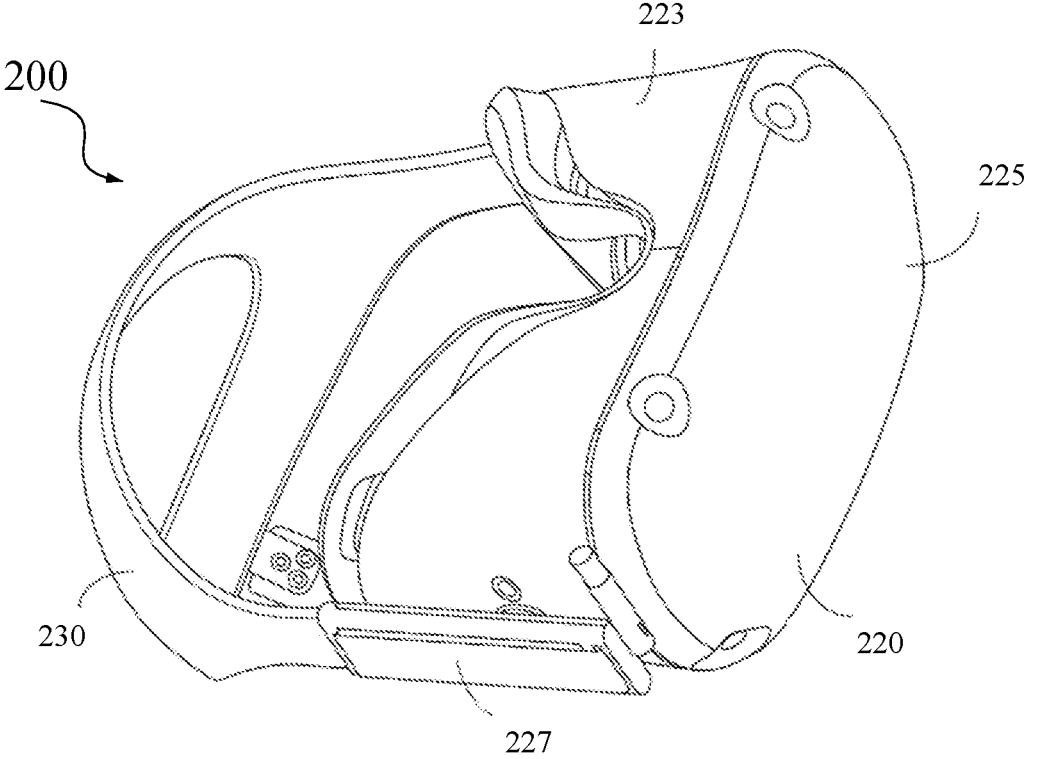
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMO-LED, a TOLED, some other display, or any combination thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
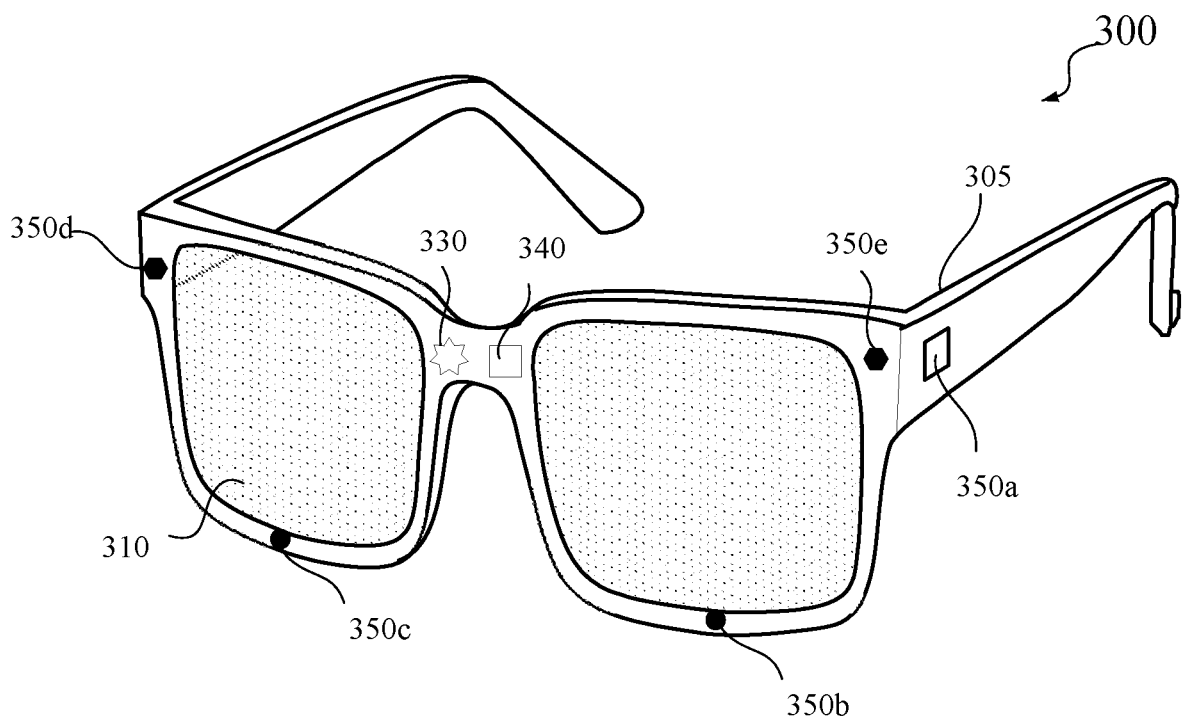
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame

305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. High-resolution camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
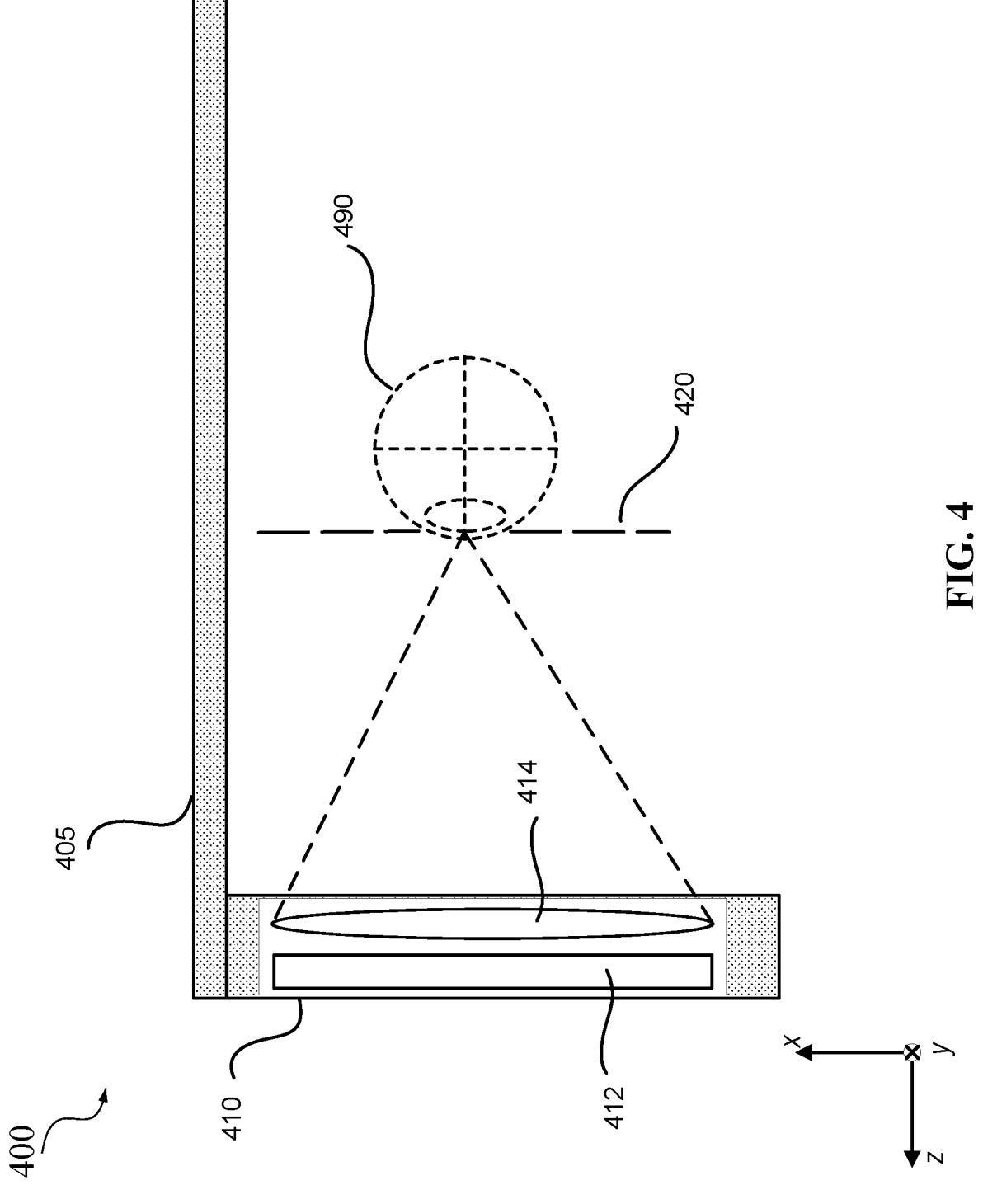
FIG. 4 is a cross-sectional view of an example of a near-eye display according to certain embodiments.

FIG. 4 is a cross-sectional view of an example of a near-eye display 400 according to certain embodiments. Near-eye display 400 may include at least one display assembly 410. Display assembly 410 may be configured to direct image light (e.g., display light) to an eyebox located at an exit pupil 420 and to user's eye 490. It is noted that, even though FIG. 4 and other figures in the present disclosure show an eye of a user of the near-eye display for illustration purposes, the eye of the user is not a part of the corresponding near-eye display.

As HMD device 200 and near-eye display 300, near-eye display 400 may include a frame 405 and display assembly 410 that may include a display 412 and/or display optics 414 coupled to or embedded in frame 405. As described above, display 412 may display images to the user electrically (e.g., using LCDs, LEDs, OLEDs) or optically (e.g., using a waveguide display and optical couplers) according to data received from a processing unit, such as console 110. In some embodiments, display 412 may include a display panel that includes pixels made of LCDs, LEDs, OLEDs, and the like. Display 412 may include sub-pixels to emit light of a predominant color, such as red, green, blue, white, or yellow. In some embodiments, display assembly 410 may include a stack of one or more waveguide displays including, but not restricted to, a stacked waveguide display, a varifocal waveguide display, and the like. The stacked waveguide display may be a polychromatic display (e.g., a red-green-blue (RGB) display) created by stacking waveguide displays whose respective monochromatic sources are of different colors.

Display optics 414 may be similar to display optics 124 and may display image content optically (e.g., using optical waveguides and optical couplers), correct optical errors associated with the image light, combine images of virtual objects and real objects, and present the corrected image light to exit pupil 420 of near-eye display 400, where the user's eye 490 may be located. In some embodiments, display optics 414 may also relay the images to create virtual images that appear to be away from display 412 and further than just a few centimeters away from the eyes of the user. For example, display optics 414 may collimate the image source to create a virtual image that may appear to be far away (e.g., greater than about 0.3 m, such as about 0.5 m, 1 m, or 3 m away) and convert spatial information of the displayed virtual objects into angular information. In some embodiments, display optics 414 may also magnify the source image to make the image appear larger than the actual size of the source image. More details of display 412 and display optics 414 are described below.

In various implementations, the optical system of a near-eye display, such as an HMD, may be pupil-forming or non-pupil-forming. Non-pupil-forming HMDs may not use intermediary optics to relay the displayed image, and thus the user's pupils may serve as the pupils of the HMD. Such non-pupil-forming displays may be variations of a magnifier (sometimes referred to as "simple eyepiece"), which may magnify a displayed image to form a virtual image at a greater distance from the eye. The non-pupil-forming display may use fewer optical elements. Pupil-forming HMDs may use optics similar to, for example, optics of a compound microscope or telescope, and may include some forms of projection optics that magnify an image and relay it to the exit pupil.

Figure 5:
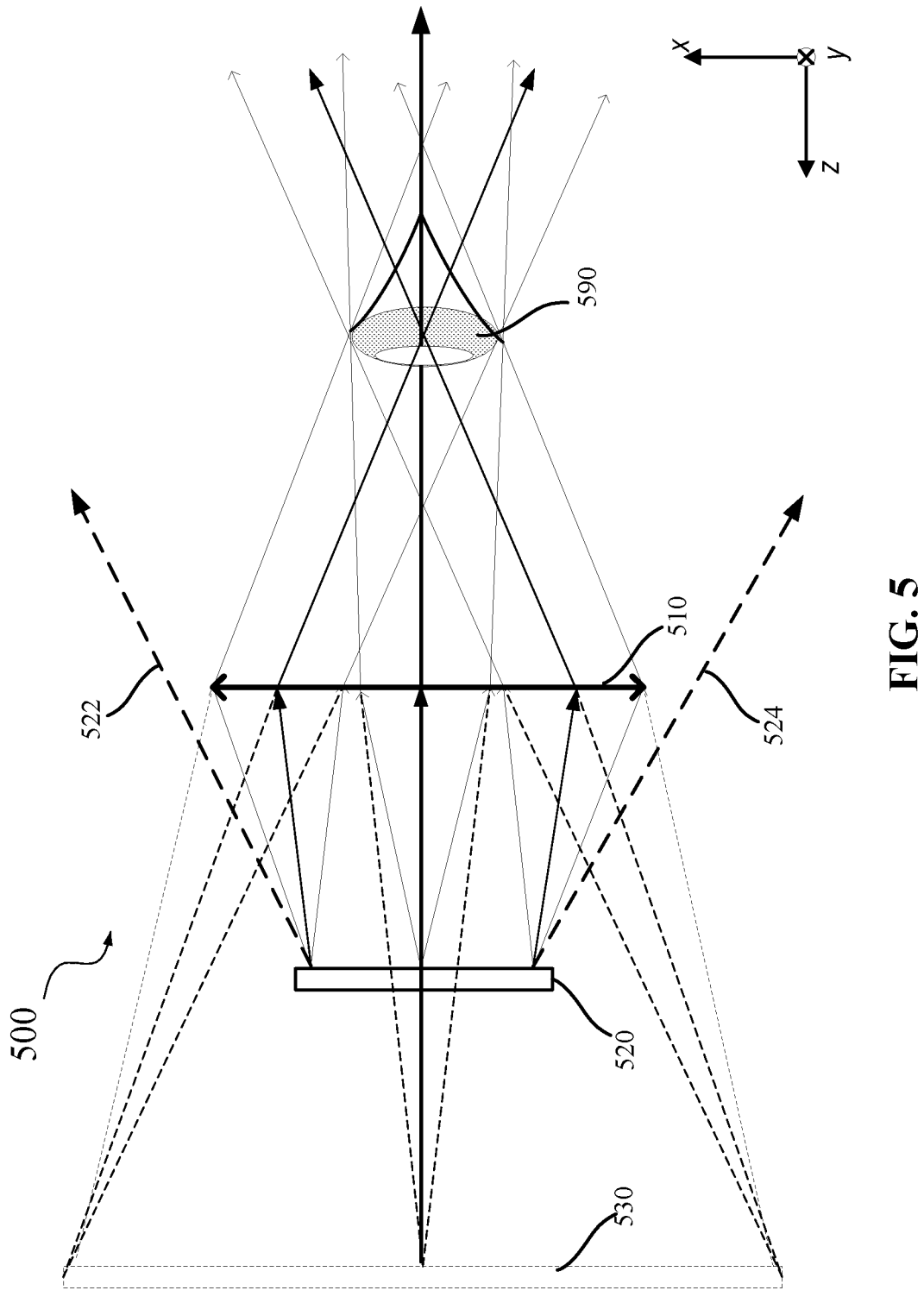
FIG. 5 illustrates an example of an optical system with a non-pupil forming configuration for a near-eye display device according to certain embodiments.

FIG. 5 illustrates an example of an optical system 500 with a non-pupil forming configuration for a near-eye display device according to certain embodiments. Optical system 500 may be an example of near-eye display 400, and may include display optics 510 and an image source 520 (e.g., a display panel). Display optics 510 may function as a magnifier. FIG. 5 shows that image source 520 is in front of display optics 510. In some other embodiments, image source 520 may be located outside of the field of view of the user's eye 590. For example, one or more deflectors or directional couplers may be used to deflect light from an image source to make the image source appear to be at the location of image source 520 shown in FIG. 5. Image source 520 may be an example of display 412 described above. For example, image source 520 may include a two-dimensional array of light emitters, such as semiconductor micro-LEDs or micro-OLEDs. The dimensions and pitches of the light emitters in image source 520 may be small. For example, each light emitter may have a diameter less than 2 μm (e.g., about 1.2 μm) and the pitch may be less than 2 μm (e.g., about 1.5 μm). As such, the number of light emitters in image source 520 can be equal to or greater than the number of pixels in a display image, such as 960×720, 1280×720, 1440×1080, 1920×1080, 2160×1080, 2560×1080, or even more pixels. Thus, a display image may be generated simultaneously by image source 520.

Light from an area (e.g., a pixel or a light emitter) of image source 520 may be directed to a user's eye 590 by display optics 510. Light directed by display optics 510 may form virtual images on an image plane 530. The location of image plane 530 may be determined based on the location of image source 520 and the focal length of display optics 510. A user's eye 590 may form a real image on the retina of user's eye 590 using light directed by display optics 510. In this way, objects at different spatial locations on image source 520 may appear to be objects on an image plane far away from user's eye 590 at different viewing angles. Image source 520 may have a size larger or smaller than the size (e.g., aperture) of display optics 510. Some light emitted from image source 520 with large emission angles (as shown by light rays 522 and 524) may not be collected and directed to user's eye 590 by display optics 510, and may become stray light.

The display panels or image sources described above (e.g., display 412 or image source 520) may be implemented using, for example, a liquid crystal display (LCD), an organic light emitting diode (OLED) display, a micro-OLED display, an inorganic light emitting diode (ILED) display, a micro-light emitting diode (micro-LED) display, an active-matrix OLED display (AMOLED), a transparent OLED display (TOLED), or some other displays. In a near-eye display system, it is generally desirable that the image source or the display panel has a higher resolution and a large size, such that the near-eye display system may have a large field of view (FOV) and better image quality to, for example, improve the immersive experience of using the near-eye display system. The FOV of a display system is the angular range over which an image may be projected in the near or far field. The FOV of a display system is generally measured in degrees, and the resolution over the FOV is generally measured in pixels per degree (PPD). The FOV of a display system may be linearly proportional to the size of the image source (e.g., the display panel), and may be inversely proportional to the focal length of the display optics (e.g., a collimation lens or lens assembly). A balance between the size of the image source and the optical power of the display optics may be needed in order to achieve a good modulation transfer function (MTF) and reduced size/weight/cost. The field of view may be increased by bringing the image source closer, but the image source would need to have higher PPD, and the aberrations of the display optics at the periphery may limit the effective field of view. To achieve a high PPD, micro displays with ultra-high pixels per inch (PPI) may be needed. There may be many technological challenges and cost issues associated with making high-PPI display panels, such as high resolution LCD panels.

Figure 6:
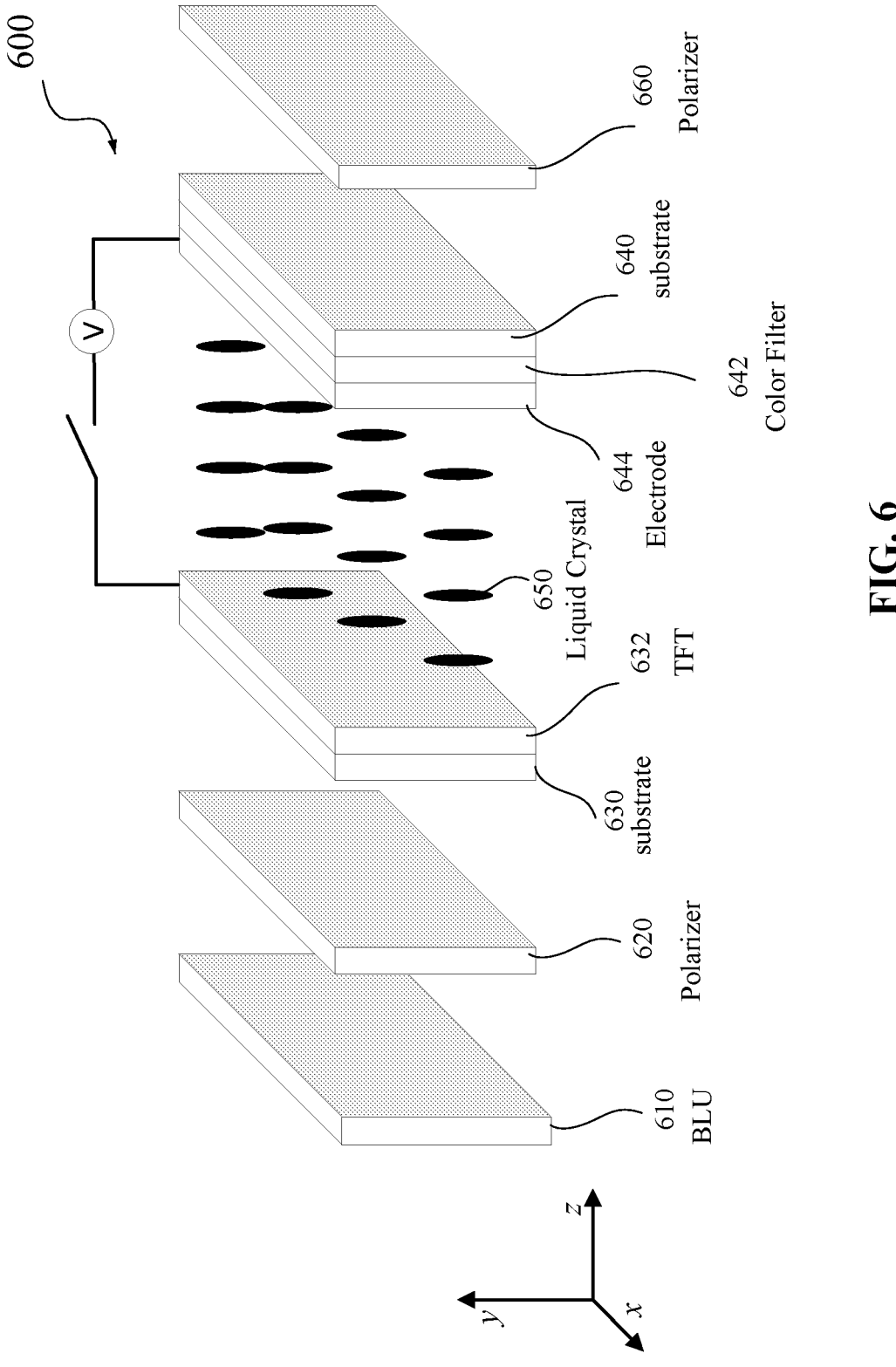
FIG. 6 illustrates an example of a liquid crystal display (LCD) panel.

FIG. 6 illustrates an example of an LCD panel 600. As illustrated, LCD panel 600 may include a backlight unit (BLU) 610 configured to emit illumination light, a first polarizer 620 configured to control the type of light that can pass through (e.g., based on the polarization state of the light), an LCD cell that may modulate (e.g., the phase or polarization state of) the incident light, and a second polarizer 660 for control the type of light that can pass through (e.g., based on the polarization state of the light). In some embodiments, BLU 610 may include a light source (e.g., a cold-cathode fluorescent lamp) configured to emit white light. In some embodiments, BLU 610 may include blue light-emitting LEDs, a light guide plate, and a quantum dot enhancement film that includes quantum dots for converting some blue light to red light and green light.

In the illustrated example, the LCD cell may include a first substrate 630 (e.g., a glass substrate or another transparent dielectric substrate) including a thin-film transistor (TFT) array 632 formed thereon. TFT array 632 may include an array of transistors for controlling the intensity of each pixel (e.g., by controlling the orientations of the liquid crystal molecules in a liquid crystal layer, thereby controlling the rotation angle of the polarization direction of the incident light). The LCD cell may also include a second substrate 640 with a common electrode 644 and a color filter (CF)/black-matrix (BM) array 642 formed thereon. One or more liquid crystal layers 650 may be sandwiched by first substrate 630 and second substrate 640.

In some other implementations, first substrate 630 may include both TFT array 632 and color filters formed on TFT array 632 to form a color filter on array (COA) structure, whereas the top substrate may include a common electrode and a black matrix formed on another glass substrate. The COA structure may enable a simplified process, improved aperture ratio, and reduced production cost. In some implementations, the LCD cell may be a fringe field switching (FFS) mode LCD cell, where the pixel electrodes and the common electrode may both be formed on the bottom substrate, and the top substrate may include a black matrix and an overcoat layer formed thereon.

Light emitted by BLU 610 (e.g., white light or blue light) may be polarized by first polarizer 620 (e.g., a linear polarizer with a polarizing axis in a first direction). The polarized light may pass through an array of apertures between the TFTs in TFT array 632. The polarized light may be modulated by the one or more liquid crystal layers 650 to change the polarization state (e.g., the polarization direction) according to the voltage signal applied to each region of the one or more liquid crystal layers 650. CF/BM array 642 may include red, green, and blue color filters, where each color filter may allow light of one color to pass through. Light passing through each color filter may become a subpixel of a color image pixel that may include three subpixels, and may be filtered by second polarizer 660 such that the change in the polarization state may be converted into a change in the light intensity or brightness. For example, second polarizer 660 may include a linear polarizer with a polarizing axis in a second direction that may be the same as or different from the first direction.

Figure 7:
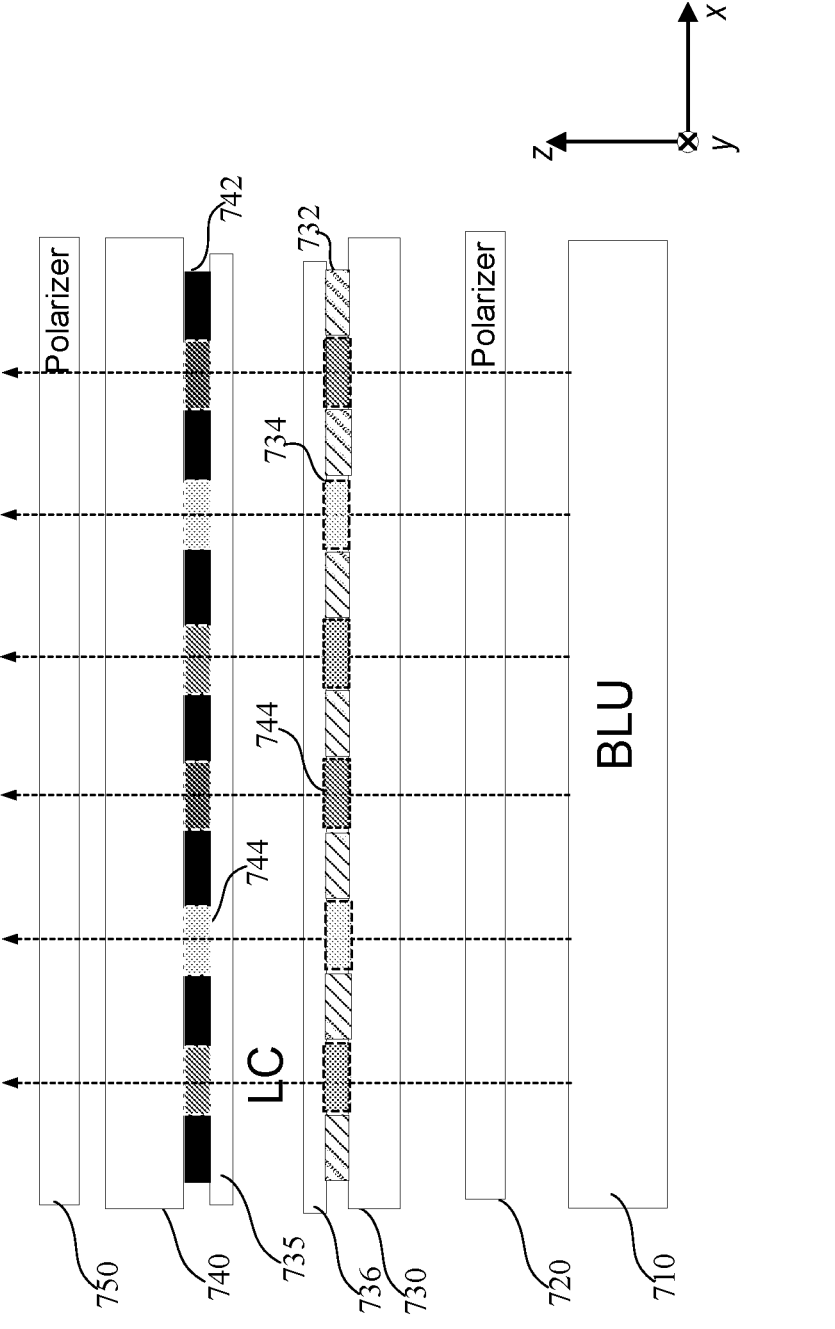
FIG. 7 illustrates an example of a layer stack of an LCD panel.
Figure 7:
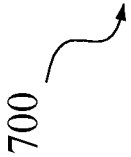

FIG. 7 illustrates an example of a layer stack of an LCD panel 700. LCD panel 700 may be an example of LCD panel 600. In the illustrated example, LCD panel 700 may include a BLU 710, a first polarizer 720, a TFT array 730 including a black-mask layer 732 and an array of apertures 734, a common electrode layer 735, a CF/BM array 740 including a black-matrix layer 742 and optionally an array of color filter elements 744 in black-matrix layer 742, and a second polarizer 750. BLU 710 may be similar to BLU 610 described above. Black-mask layer 732 may include TFT circuits (e.g., TFTs, gate electrodes, source electrodes, etc.) for controlling liquid crystal molecules filled between TFT array 730 and common electrode layer 735. Common electrode layer 735 may include a transparent conductive oxide (TCO), such as indium tin oxide (ITO). Color filter elements 744 may include red, green, and blue color filters. Centers of color filter elements 744 may align with corresponding centers of apertures 734 on TFT array 730, such that light from BLU 710 and first polarizer 720 may pass through apertures 734 and color filter elements 744. Second polarizer 750 may include a linear polarizer with a polarizing axis in a direction that is different from or same as the direction of the polarizing axis of first polarizer 720. For example, the direction of the polarizing axis of first polarizer 720 may be orthogonal to the direction of the polarizing axis of second polarizer 750. First polarizer 720 and second polarizer 750 may be used in combination to convert the change in the polarization state (e.g., polarization direction) by the liquid crystal layer to change in the light intensity so as to display images to user's eyes.

As described above with respect to FIG. 6, in some implementations, instead of forming color filter elements 744 on a separate substrate, color filter elements 744 may be formed on TFT array 730 to form a COA structure. In some implementations, the LCD cell may be an FFS mode LCD cell, where both the pixel electrodes and the common electrode may be formed on the bottom substrate with TFT array 730. In other implementations, the TFT array, the color filters, the black matrix, and the electrodes may be arranged in other manners on the two substates that sandwich the liquid crystal material.

Even though not shown in FIG. 7, spacers (e.g., plastic spacers) may be used between TFT array and/or black-mask 732 and common electrode layer 735 to separate TFT array and/or black-mask 732 and common electrode layer 735 so that liquid crystal materials may be filled between TFT array and/or black-mask 732 (or a protective or planarization layer 736) and common electrode layer 735 to modulate incident light. For example, TFT array and/or black-mask 732 may include column spacers formed thereon (e.g., on top of source electrodes), and the CF/BM array (or black-matrix layer 742 or common electrode layer 735) may include photo spacers formed thereon. When first substrate 730 and second substrate 740 are assembled to form an LCD cell, photo spacers may sit on corresponding column spacers to achieve the desired separation between TFT array and/or black-mask 732 and the CF/BM array (or black-matrix layer 742 or common electrode layer 735).

Figure 8B:
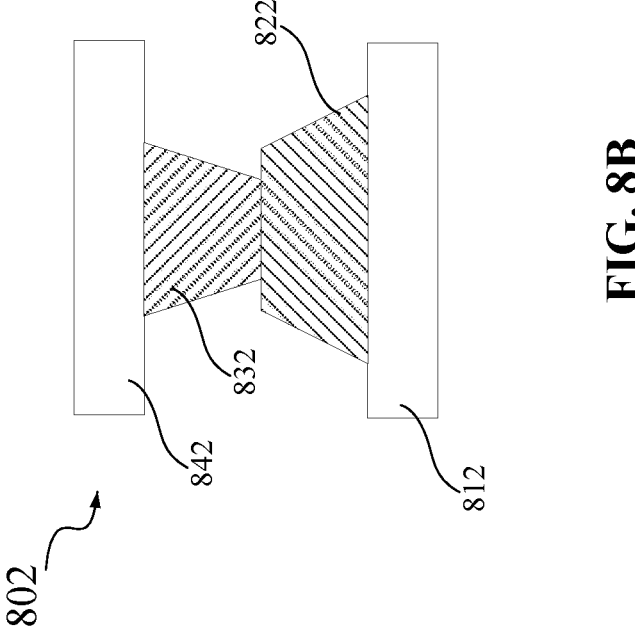
FIGS. 8A-8B illustrate examples of photo spacers and column spacers in LCD cells.
Figure 8A:
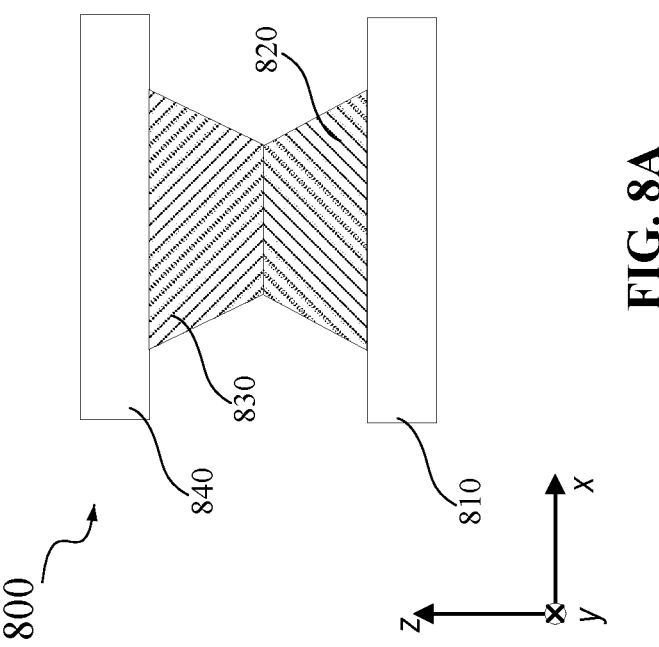

FIGS. 8A-8B illustrate examples of photo spacers and column spacers in LCD cells. In the example shown in FIG. 8A, an LCD cell 800 may include a bottom substrate 810 and a top substrate 840 that are separated by column spacers 820 and photo spacers 830. Bottom substrate 810 may include, for example, a glass substrate with TFT circuits (and black mask) formed thereon, where the TFT circuits may include thin-film transistors, pixel electrodes (e.g., source electrodes and gate electrodes), electrical interconnects, and other circuits. Top substrate 840 may include, for example, a glass substrate with a black matrix, color filters, and a common electrode layer formed thereon, as described above with respect to, for example, FIGS. 6 and 7. Column spacers 820 and photo spacers 830 may include, for example, an organic material (e.g., a plastic material) or another non-conductive material with a certain stiffness, or a metal with a non-conductive coating. Photo spacers 830 may sit on top of column spacers 820 when properly assembled. The heights of photo spacers 830 and column spacers 820 may be selected to achieve a desired distance between top substrate 840 and bottom substrate 810. In the example shown in FIG. 8A, the top surface of a column spacer 820 and the bottom surface of a corresponding photo spacer 830 may have about the same size and may be aligned properly.

In the example shown in FIG. 8B, an LCD cell 802 may include a bottom substrate 812 and a top substrate 842 separated by column spacers 822 and photo spacers 832. Bottom substrate 812 may be similar to bottom substrate 810, and top substrate 842 may be similar to top substrate 840. A column spacer 822 may have a lateral size larger than the lateral size of a corresponding photo spacer 832, and thus photo spacer 832 may remain sitting on top of column spacer

822 even if there is a small amount of lateral displacement or misalignment between bottom substrate 812 and top substrate 842.

When an LCD panel is bent, pressed, or otherwise deformed, the substrate deflection or deformation may cause the displacement of the photo spacers with respect to the column spacers, such that some photo spacers may no longer sit on the corresponding column spacers. When the displacement is larger than the size of a photo spacer or a column spacer, the photo spacer may touch the bottom substrate instead of the column spacer, and thus may cause damages to surrounding regions or otherwise affect the light transmission/modulation in the surrounding regions. Therefore, light transmission or illuminance in some areas may be different or anomalous from the neighboring areas, which may be referred to as mura defects. In LCD panels with higher resolution, the pixels and the pitch of the array of pixels may be small, and thus the spacers may be small as well. Therefore, a small displacement may cause the disengagement of the photo spacers and the column spacer. As such, mura defects may become more severe in LCD panels with higher resolution.

FIG. 9A illustrates an example of an LCD cell 900 with large photo spacers and column spacers. As LCD cells 800 and 802, LCD cell 900 may include a bottom substrate 910 and a top substrate 940 that are separated by column spacers 920 and photo spacers 930. Bottom substrate 910 may be similar to bottom substrate 810, and top substrate 940 may be similar to top substrate 840. LCD cell 900 may have a lower resolution and a larger pixel pitch. Therefore, column spacers 920 and photo spacers 930 can be made larger without impacting the light transmission. When bottom substrate 910 and top substrate 940 are properly aligned (e.g., no force to bend or shift top substrate 940 with respect to bottom substrate 910), the top surface of a column spacer 920 and the bottom surface of a corresponding photo spacer 930 may be aligned properly.

FIG. 9B illustrates an example of lateral displacement between a photo spacer 930 and a column spacer 920 in LCD cell 900 of FIG. 9A due to, for example, glass deflection. The displacement may be caused by, for example, a force applied to top substrate 940 and/or bottom substrate 910 that may cause the lateral displacement or bending of top substrate 940. Since column spacers 920 and photo spacers 930 may be relatively large, photo spacer 930 may still be on top of and in contact with column spacer 920 when the lateral displacement is small.

FIG. 9C illustrates an example of an LCD cell 902 with smaller photo spacers 932 and column spacers 922. LCD cell 902 may include a bottom substrate 912 and a top substrate 942 that are separated by column spacers 922 and photo spacers 932. Bottom substrate 912 may be similar to bottom substrate 810, and top substrate 942 may be similar to top substrate 840. LCD cell 902 may have a higher resolution and thus a smaller pixel pitch. Therefore, column spacers 922 and photo spacers 932 may be smaller than column spacers 920 and photo spacers 930, respectively. When bottom substrate 912 and top substrate 942 are properly aligned (e.g., no force to bend or shift top substrate 942 with respect to bottom substrate 912), the top surface of a column spacer 922 and the bottom surface of a corresponding photo spacer 932 may be aligned properly.

FIG. 9D illustrates an example of lateral displacement between a photo spacer 932 and a column spacer 922 in LCD cell 902 of FIG. 9C due to, for example, glass deflection. The lateral displacement may be caused by, for example, a force applied to top substrate 942 and/or bottom substrate 912 that may cause the lateral displacement or bending of top substrate 942. Since column spacers 922 and photo spacers 932 may be relatively small, a photo spacer 930 may disengage with the corresponding column spacer and may touch bottom substrate 912 to cause mura failures even if the lateral displacement is small.

According to certain embodiments disclosed herein, a column spacer (CS) (or photo spacer (PS)) of an LCD cell may be split into two parts with tapered or rounded corners to create a pocket or recess with outwardly tilted sidewalls for receiving a tapered photo spacer (or column spacer). The engagement between the PS and the CS through the pocket or recess may restrict the relative displacement between the PS and the CS, and thus may prevent the PS from disengaging with the CS and contacting the bottom substrate to cause damages or otherwise affect the light transmission/modulation in the surrounding regions. In some embodiments, the slot or gap between the two parts of a split CS (or PS) may be rectangular, which may limit the relative movement between the PS and the CS in one direction while allowing relative movement between the PS and the CS in a perpendicular direction. In some embodiments, the slot or gap between the two portions of a split CS (or PS) may be slanted, which may allow some amount of relative lateral movement between the PS and the CS along the slanted direction. The split column spacers may be arranged to have different orientations, according to a pattern or randomly, to restrict the relative lateral movement between the PS and the CS in all directions in a lateral plane. As such, mura defects due to the displacement of the spacers may be reduced or avoided.

Figures 10A, 10B, 10C, 10D:
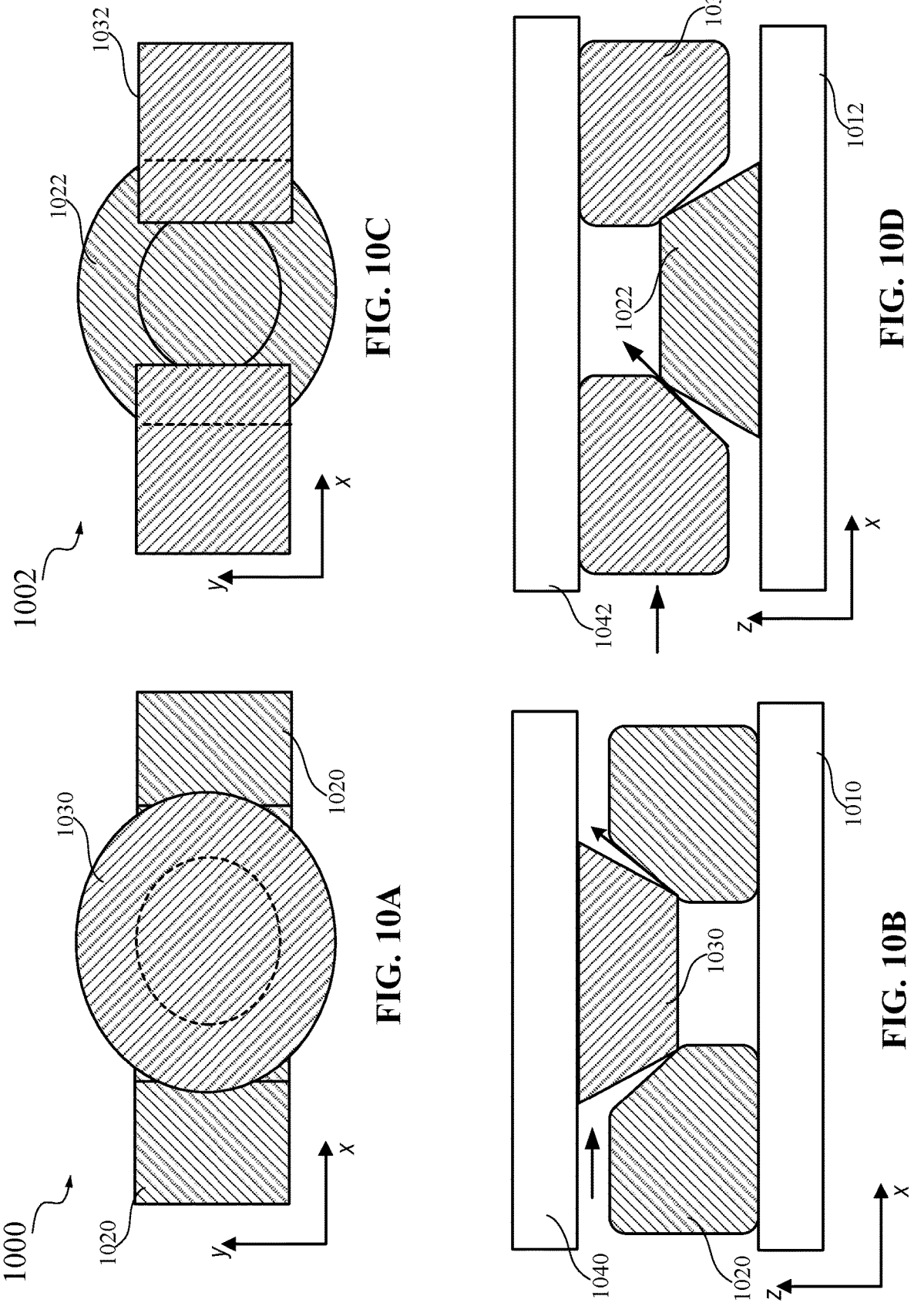
FIGS. 10A-10B illustrate an example of a photo spacer and a split column spacer in an LCD cell according to certain embodiments.
FIGS. 10C-10D illustrate an example of a split photo spacer and a column spacer in an LCD cell according to certain embodiments.

FIGS. 10A-10B illustrate an example of a photo spacer 1030 and a split column spacer 1020 in an LCD cell 1000 according to certain embodiments. FIG. 10A is a top view of photo spacer 1030 engaged with split column spacer 1020. FIG. 10B is a cross-sectional view of a portion of LCD cell 1000. In the illustrated example, LCD cell 1000 may include a bottom substrate 1010 and a top substrate 1040 that are separated by column spacers 1020 and photo spacers 1030. Bottom substrate 1010 may be similar to bottom substrate 810, and top substrate 1040 may be similar to top substrate 840. In the illustrated example, column spacer 1020 may be split into two parts that are separate from each other in the x direction. Top portions of the sidewalls of the two parts of split column spacer 1020 at the gap between the two parts may be tilted or rounded in opposite directions to form a pocket or recess with sidewalls tilted outwardly in the z direction. Photo spacer 1030 may be tapered in the −z direction and thus may be received in the pocket or recess formed by split column spacer 1020. Therefore, the relative displacement between photo spacer 1030 and split column spacer 1020 in the x direction may be restricted. In some embodiments, the relative displacement between photo spacer 1030 and split column spacer 1020 in the x direction may cause photo spacer 1030 to slide along a tilted sidewall of the pocket or recess to move in the z direction as shown in FIG. 10B. Therefore, photo spacer 1030 may not contact bottom substrate 1010 even if there is relative displacement between photo spacer 1030 and split column spacer 1020 in the x direction.

FIGS. 10C-10D illustrate an example of a split photo spacer 1032 and a column spacer 1022 in an LCD cell 1002 according to certain embodiments. FIG. 10C is a top view of split photo spacer 1032 engaged with column spacer 1022. FIG. 10D is a cross-sectional view of a portion of LCD cell 1002. In the illustrated example, LCD cell 1002 may include a bottom substrate 1012 and a top substrate 1042 that are separated by column spacers 1022 and photo spacers 1032. Bottom substrate 1012 may be similar to bottom substrate 810, and top substrate 1042 may be similar to top substrate 840. In the illustrated example, split photo spacer 1032 may be split into two parts that are separate from each other in the x direction. Bottom portions of the sidewalls of the two parts of split photo spacer 1032 at the gap between the two parts may be tilted in opposite directions to form a pocket or recess with sidewalls tilted outwardly in the −z direction. Column spacer 1022 may be tapered in the z direction and thus may be received in the pocket or recess formed by split photo spacer 1032. Therefore, relative displacement between split photo spacer 1032 and column spacer 1022 in the x direction may be restricted. In some embodiments, the relative displacement between split photo spacer 1032 and column spacer 1022 in the x direction may cause split photo spacer 1032 to slide along a tilted surface of column spacer 1022 to move in the z direction as shown in FIG. 10D. Therefore, split photo spacer 1032 may not contact bottom substrate 1012 even if there is relative displacement between split photo spacer 1032 and column spacer 1022 in the x direction.

Figures 11A, 11B, 11C:
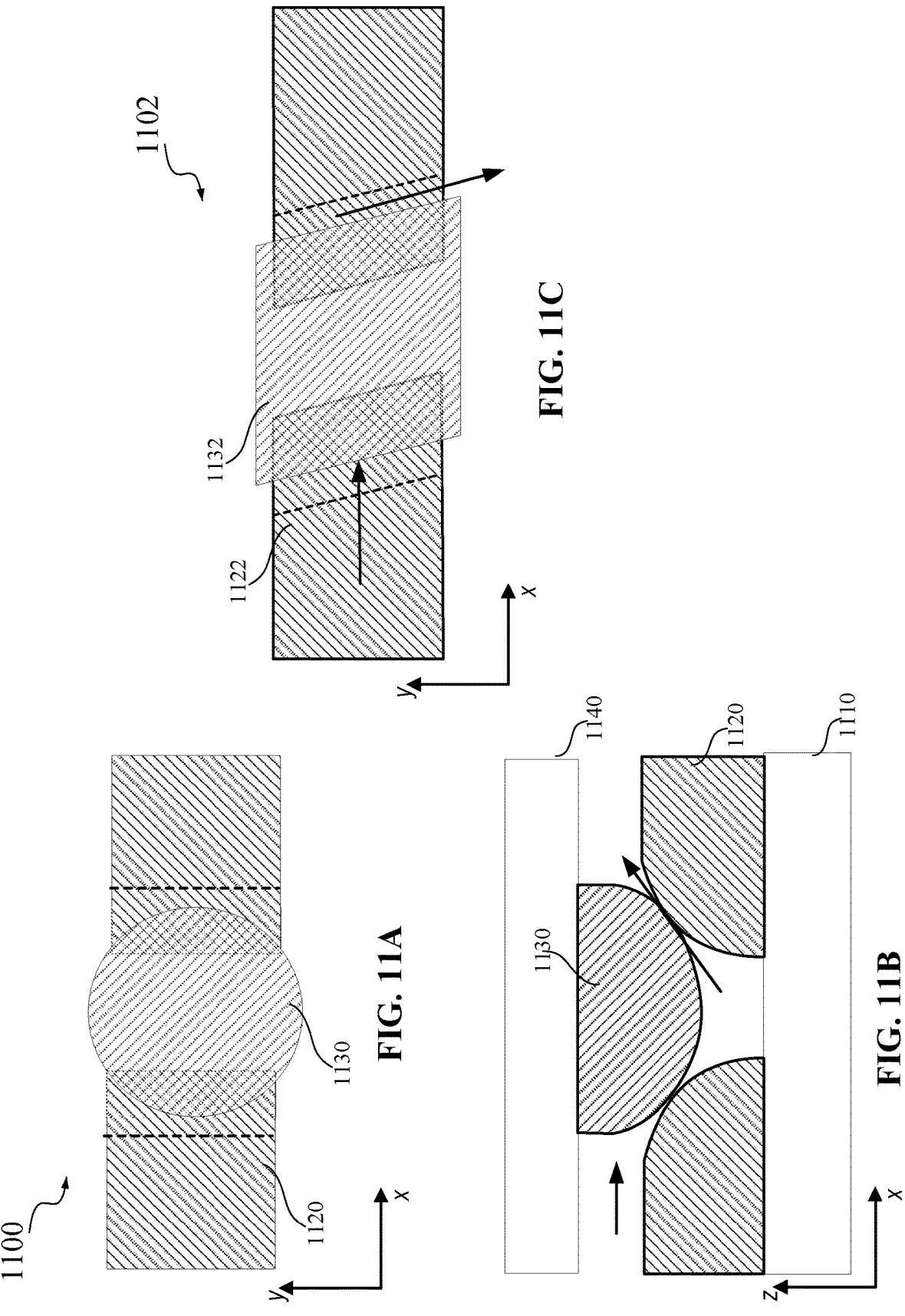
FIG. 11A is a top view of an example of a photo spacer and a split column spacer in an LCD cell according to certain embodiments.
FIG. 11B is a cross-sectional view of the LCD cell of FIG. 11A according to certain embodiments.
FIG. 11C is a top view of an example of a photo spacer and a split column spacer in an LCD cell according to certain embodiments.

FIG. 11A is a top view of an example of a photo spacer 1130 and a split column spacer 1120 in an LCD cell 1100 according to certain embodiments. FIG. 11B is a cross-sectional view of LCD cell 1100 of FIG. 11A according to certain embodiments. In the example shown in FIGS. 11A and 11B, LCD cell 1100 may include a bottom substrate 1110 and a top substrate 1140 that are separated by split column spacers 1120 and photo spacers 1130. Bottom substrate 1110 may be similar to bottom substrate 810, and top substrate 1140 may be similar to top substrate 840. In the illustrated example, split column spacer 1120 may be split into two parts that are separate from each other in the x direction. The sidewalls of the two parts of split column spacer 1120 at the gap between the two parts may be rounded to form a pocket or recess with a width (e.g., measured in the x direction) gradually increasing in the z direction. Photo spacer 1130 may have a circular shape in an x-y plane and may have a rounded bottom surface as shown in FIG. 11B. Photo spacer 1130 may be received in the pocket or recess formed by split column spacer 1120. Therefore, relative displacement between photo spacer 1130 and split column spacer 1120 in the x direction may be restricted. In some embodiments, the relative displacement between photo spacer 1130 and split column spacer 1120 in the x direction may cause photo spacer 1130 to slide along a sidewall of the pocket or recess to move in the z direction. Therefore, photo spacer 1130 may not contact bottom substrate 1110 even if there is relative displacement between photo spacer 1130 and split column spacer 1120 in the x direction.

FIG. 11C is a top view of another example of a photo spacer 1132 and a split column spacer 1122 in an LCD cell 1102 according to certain embodiments. The cross-sectional view of LCD cell 1102 of FIG. 11C may be similar to the cross-sectional view of LCD cell 1100 as shown in FIG. 11B. In the illustrated example, LCD cell 1102 may include a bottom substrate and a top substrate separated by split column spacers 1122 and photo spacers 1132. The bottom substrate may be similar to bottom substrate 1110, and the top substrate may be similar to top substrate 1140. Split column spacer 1122 may be split into two parts that are arranged along the x direction and separate from each other in the x direction. The gap between the two parts may be slanted in an x-y plane (top view). The sidewalls of the two parts of split column spacer 1122 at the gap between the two parts may be rounded to form a pocket or recess with a width (e.g., measured in the x direction) gradually increasing in the z direction. Photo spacer 1132 may have a cross-sectional shape of a parallelogram in an x-y plane and may have a rounded bottom surface as shown in FIG. 11B. Photo spacer 1132 may be received in the pocket or recess formed by split column spacer 1122. As shown in FIGS. 11B and 11C, the relative displacement between photo spacer 1132 and split column spacer 1122 in the x direction may cause photo spacer 1132 to slide along a sidewall of the pocket or recess to move in the z direction and the −y direction and slightly in the x direction.

Figure 12:
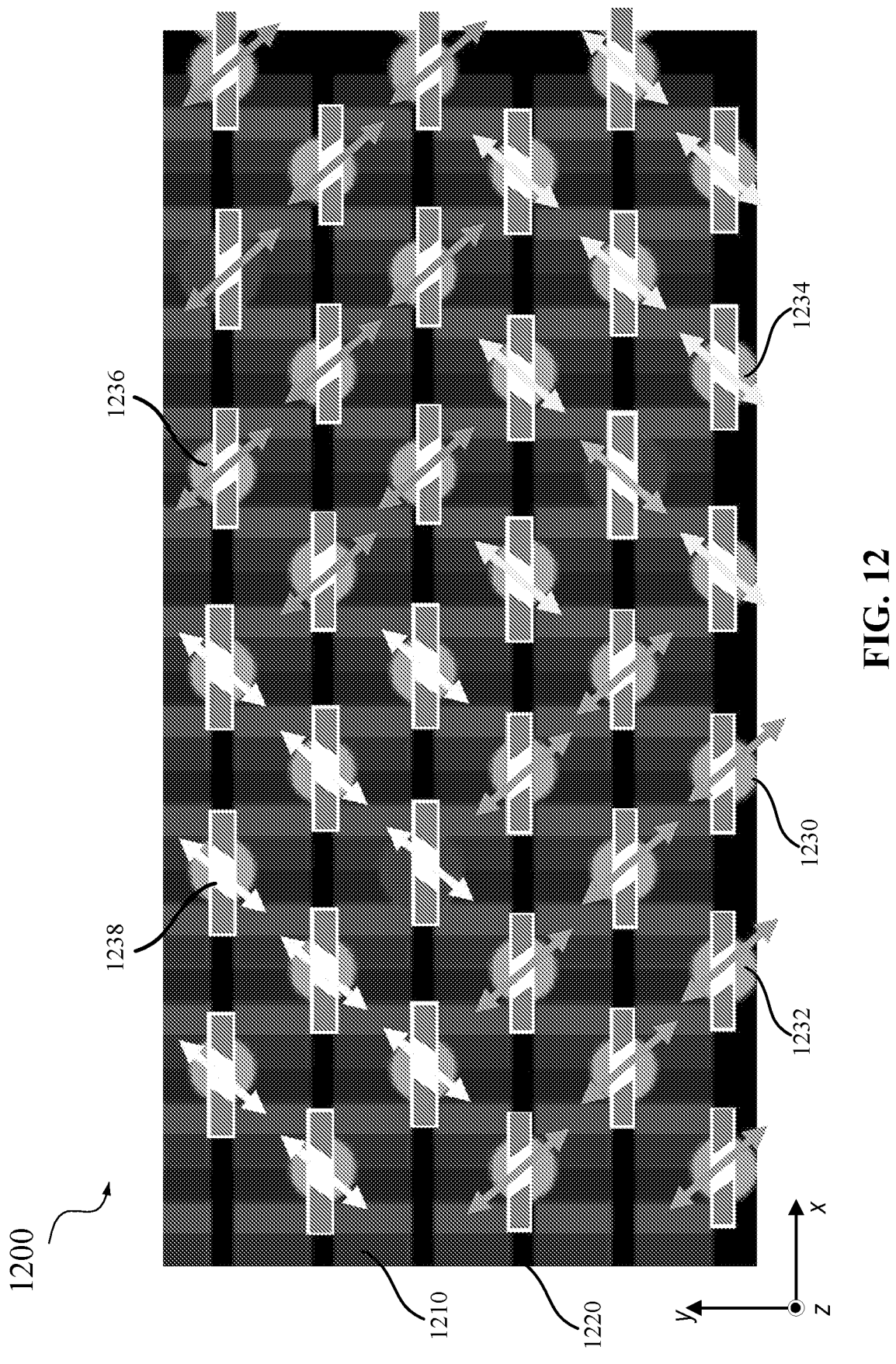
FIG. 12 illustrates an example of an LCD panel including split photo spacers and/or split column spacers having different orientations across the LCD panel according to certain embodiments.

FIG. 12 illustrates an example of an LCD panel 1200 including split column spacers (or split photo spacers) having different orientations across LCD panel 1200 according to certain embodiments. FIG. 12 shows a two-dimensional array of pixel 1210, an array of backplane electrodes 1220 (e.g., gate electrodes that each extend in the x direction and are arranged along the y direction), and a two-dimensional array of PS/CS pairs 1230 on backplane electrodes 1220 (e.g., the gate electrodes). Even though not shown in FIG. 12, LCD panel 1200 may also include vertical and horizontal black masks and other backplane electrodes, such as source electrodes that each extend in the y direction and arranged along the x direction. Each PS/CS pair 1230 may include a PS and a split CS (or a CS and a split PS) as described above with respect to, for example, FIGS. 10A-11C. The PS/CS pairs 1230 in the two-dimensional array may have different orientations in different regions. In the example illustrated in FIG. 12, the gap between the two parts of a split CS (or PS) may be slanted with respect to the x and y directions in an x-y plane (top view) as shown in FIG. 11C. The slant directions of the gaps in the PS/CS pairs may be shown by the arrows and may be different in different regions. Therefore, the relative displacement between a top substrate and a bottom substrate in the x direction would cause some photo spacers to slide along sidewalls of the pockets or recesses to move in the z direction and the +y direction, and would cause some photo spacers to slide along sidewalls of the pockets or recesses to move in the z direction and the −y direction. As such, the top substrate and the photo spacers may not be allowed to move in either the +y or the −y direction. Since the gaps (and the pockets or recesses) within which the photo spacers may slide are slanted and thus sliding the photo spacers in the x direction would also cause the sliding in the y direction, restricting the relative displacement of the photo spacers in the ±y direction would also restrict the relative displacement of the photo spacer in the ±x direction. Therefore, the lateral displacement of the two-dimensional array of PS/CS pairs 1230 may be restricted in both the ±x direction and the ±y direction.

For example, for a PS/CS pair 1232, the relative displacement of the top substrate with respect to the bottom substrate in the x direction may cause the photo spacer to slide along a sidewall of the pocket or recess to move in the z direction, the −y direction, and the +x direction. For a PS/CS pair 1234, the relative displacement of the top substrate with respect to the bottom substrate in the x direction may cause the photo spacer to slide along a sidewall of the pocket or recess to move in the z direction, the +y direction, and the +x direction. Therefore, the relative displacement between the top substrate and the bottom substrate in the ±y direction may be restricted by PS/CS pairs 1232 and PS/CS pairs 1234.

Similarly, for a PS/CS pair 1236, the relative displacement of the top substrate with respect to the bottom substrate in the x direction may cause the photo spacer to slide along a sidewall of the pocket or recess to move in the z direction, the −y direction, and the +x direction. For a PS/CS pair 1238, the relative displacement of the top substrate with respect to the bottom substrate in the x direction may cause the photo spacer to slide along a sidewall of the pocket or recess to move in the z direction, the +y direction, and the +x direction. Therefore, the relative displacement between the top substrate and the bottom substrate in the ±y direction may be restricted by PS/CS pairs 1236 and PS/CS pairs 1238.

In addition, since the relative displacement of the top substrate with respect to the bottom substrate in the x direction may cause the photo spacer in PS/CS pair 1232 to slide along a sidewall of the pocket or recess to move in the z direction and the −y direction, and the relative displacement of the top substrate with respect to the bottom substrate in the x direction may cause the photo spacer in PS/CS pair 1238 to slide along a sidewall of the pocket or recess to move in the z direction and the +y direction, the relative displacement between the top substrate and the bottom substrate in the ±y direction may be restricted by PS/CS pairs 1232 and PS/CS pairs 1238. Similarly, the relative displacement of the top substrate with respect to the bottom substrate in the ±y direction may be restricted by PS/CS pairs 1234 and PS/CS pairs 1236.

Since the gaps (and the pockets or recesses) within which the photo spacers may slide are slanted, restricting the relative displacement of the photo spacers in the ±y direction may also restrict the relative displacement of the photo spacer in the ±x direction. As such, the lateral displacement between the top substrate and the bottom substrate may be restricted in both the ±x direction and the ±y direction. It is noted the orientation pattern of the PS/CS pairs 1230 in LCD panel 1200 shown in FIG. 12 is for illustration purposes only and is not intended to be limiting. In other embodiments, PS/CS pairs 1230 with different orientations may be arranged randomly or in a different pattern to restrict the displacement of the top substrate and the photo spacers in both the ±x direction and the ±y direction.

Figure 13:
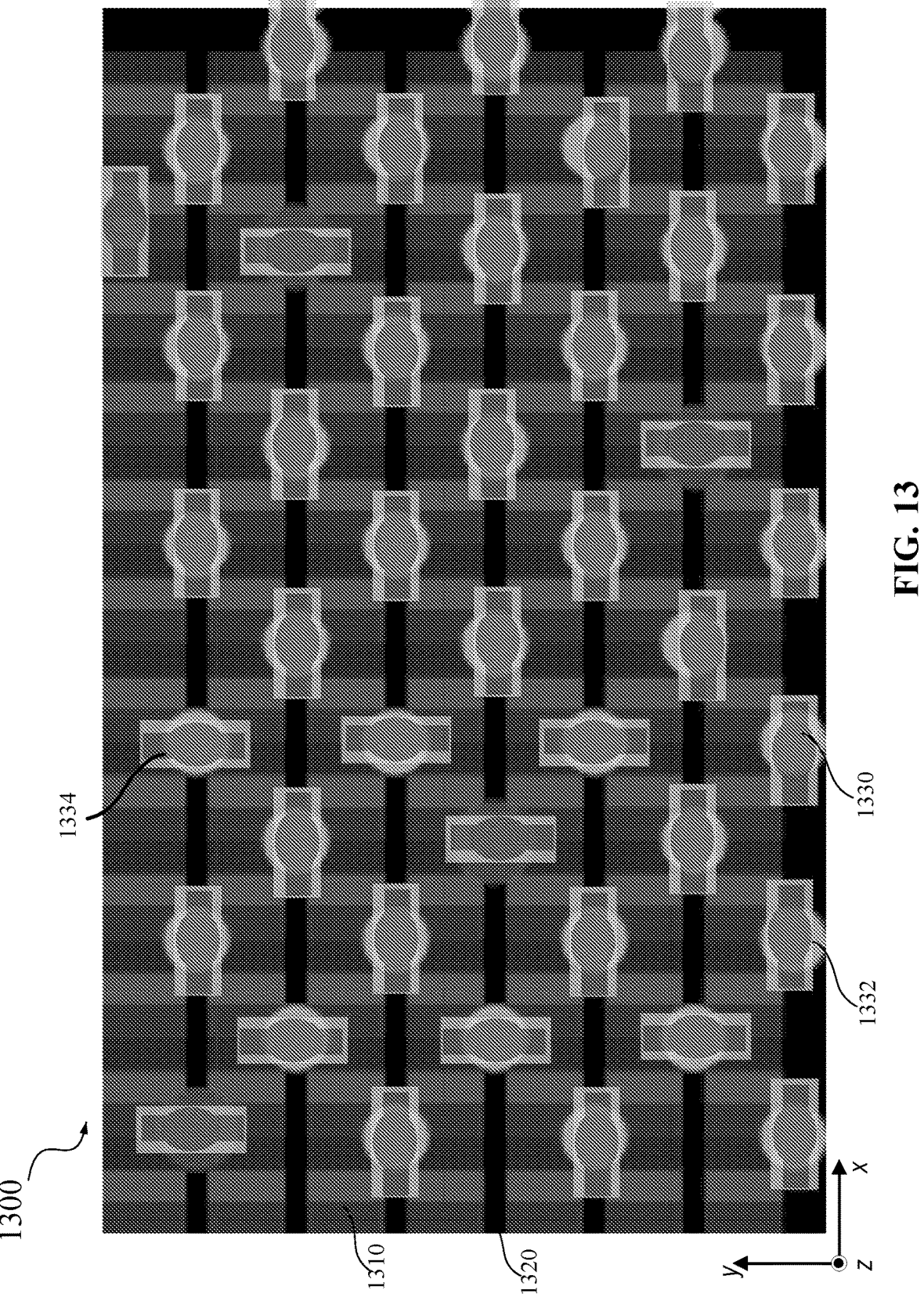
FIG. 13 illustrates an example of an LCD panel including split photo spacers and/or split column spacers having different orientations across the LCD panel according to certain embodiments.

FIG. 13 illustrates an example of an LCD panel 1300 including split column spacers (or split photo spacers) having different orientations across LCD panel 1300 according to certain embodiments. FIG. 13 shows a two-dimensional array of pixel 1310, an array of backplane electrodes 1320 (e.g., gate electrodes that each extend in the y direction and are arranged along the x direction), and a two-dimensional array of PS/CS pairs 1330. Even though not shown in FIG. 13, LCD panel 1300 may also include vertical and horizontal black masks and other backplane electrodes, such as source electrodes that each extend in the y direction and are arranged along the x direction. Each PS/CS pair 1330 may include a PS and a split CS (or a CS and a split PS) as described above with respect to FIGS. 10A-11B. The PS/CS pairs 1330 in the two-dimensional array may have different orientations in different regions. In the example shown in FIG. 13, the gap between the two parts of a split CS (or PS) may not be slanted with respect to the x or y direction in an x-y plane (top view) as shown in FIG. 11A. In some PS/CS pairs 1330 (e.g., PS/CS pairs 1332), the two parts of a split CS may be arranged along the x direction (e.g., on a gate electrode). Therefore, the relative displacement between a photo spacer and the split column spacer in the x direction may be restricted by PS/CS pairs 1332. In some PS/CS pairs 1330 (e.g., PS/CS pairs 1334), the two parts of a split CS may be arranged along the y direction (e.g., on a source electrode). Therefore, the relative displacement between a photo spacer and the split column spacer in the y direction may be restricted by PS/CS pairs 1334. As such, the displacement of the top substrate and the photo spacers may be restricted the both the ±x direction and the ±y direction.

According to certain embodiments disclosed herein, the column spacers and/or photo spacers in an LCD cell may include different types of column spacers and/or photo spacers. For example, the column spacers may include main column spacers that may engage with corresponding photo spacer as in some existing LCD display panels, and may also include sub-column spacers and safeguard column spacers. The height of the sub-column spacers may be higher than the heights of the main column spacers and the safeguard column spacers, and may not have corresponding photo spacers. The sub-column spacers may prevent the top substrate from contacting the bottom substrate and maintain a minimum distance between the bottom substrate and the top substrate. The safeguard column spacers may be slanted and tapered, and may be separate by a small distance from corresponding safeguard photo spacers that may be slanted (e.g., in the same direction as the corresponding safeguard column spacers) and tapered (e.g., in opposite direction with respect to the corresponding safeguard column spacers). The slanted safeguard column spacers and corresponding safeguard photo spacers may allow the lateral movement between the column spacers and the photo spacers along the slanted directions. The safeguard column spacers and corresponding safeguard photo spacers may be slanted in different directions in different regions of the LCD cell, so as to restrict or limit large displacement of the spacers in all directions in a lateral plane. The safeguard column spacers and corresponding safeguard photo spacers may allow some amounts of relative vertical and lateral movement between the safeguard column spacers and corresponding safeguard photo spacers along the tapering direction when there is lateral displacement between the top substrate and the bottom substrate, thereby increasing the distance between the top substrate and the bottom substrate and preventing the photo spacers from contacting the bottom substrate. As such, mura defects due to the displacement of the spacers may be reduced or avoided. Since the safeguard column spacers and the safeguard photo spacers would not restrict the vertical displacement and would not set the cell gap, there may be more design freedom to adjust the heights of the safeguard spacers to prevent cell gap crashing and achieve the desirable cell gap by controlling the heights of the main spacers.

Figures 14A, 14B:
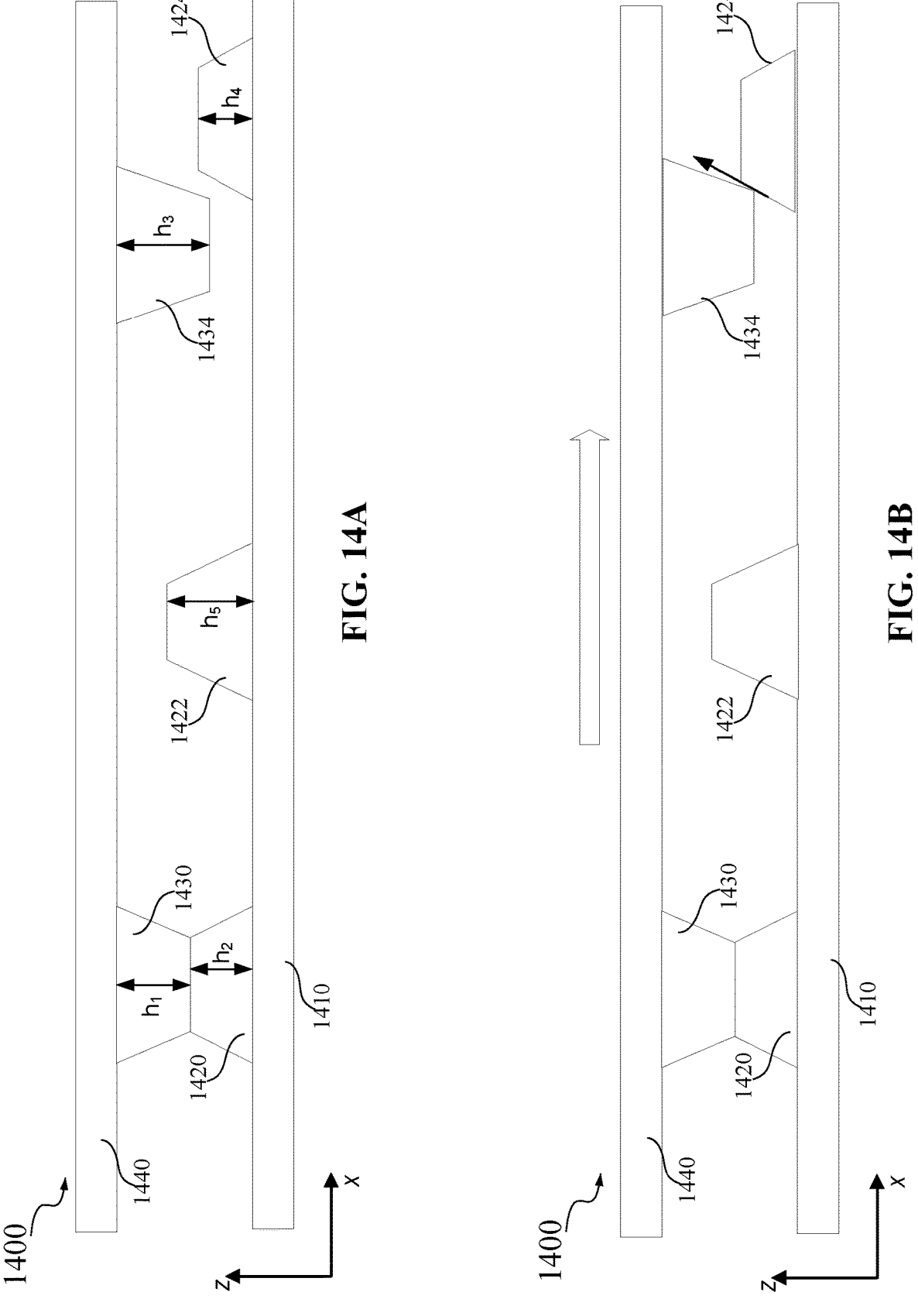
FIG. 14A illustrates an example of an LCD cell including different types of photo spacers and/or different types of column spacers according to certain embodiments.
FIG. 14B illustrates an example of restricting lateral displacement of substrates and spacers in the LCD panel of FIG. 14A according to certain embodiments.

FIG. 14A illustrates an example of an LCD cell 1400 including different types of column spacers and/or different types of photo spacers according to certain embodiments. In the example shown in FIG. 14A, LCD cell 1400 may include a bottom substrate 1410, a top substrate 1440, and various types of photo spacers and columns spacers between bottom substrate 1410 and top substrate 1440. Bottom substrate 1410 and top substrate 1440 may be similar to bottom substrate 810 and top substrate 840, respectively. The column spacers may include, for example, main column spacers 1420, sub-column spacers 1422, and safeguard column spacers 1424. The photo spacers may include, for example, main photo spacers 1430 and safeguard photo spacers 1434.

In LCD cell 1400, main photo spacers 1430 may land on main column spacers 1420, such that the distance between top substrate 1440 and bottom substrate 1410 may be the sum of the height $h_1$ of a main PS 1430 and the height $h_2$ of a main CS 1420. Sub-column spacers 1422 may not have corresponding photo spacers landed thereon. The height $h_5$ of sub-column spacers 1422 may be greater than the height $h_2$ of a main CS 1420. Sub-column spacers 1422 may be in contact with top substrate 1440 when LCD cell 1400 is mechanically pressed or bent, such as by fingers or under PS mura margin test, and may help to prevent top substrate 1440 from touching bottom substrate 1410. Each safeguard CS 1424 may be adjacent to a corresponding safeguard PS 1434, where the separation between safeguard CS 1424 and the corresponding safeguard PS 1434 in an x-y plane may be small to allow a small amount of lateral displacement of top substrate 1440 and the photo spacers formed thereon. Safeguard column spacers 1424 may be tapered in the z direction, while safeguard photo spacers 1434 may be tapered in the −z direction. The slant angle of a sidewall of a safeguard column spacer 1424 may match the slant angle of a sidewall of a corresponding safeguard photo spacer 1434. The height $h_3$ of safeguard photo spacers 1434 may be greater than the height $h_1$ of main photo spacers 1430. The height $h_4$ of safeguard column spacers 1424 may be equal to or lower than the height $h_2$ of main column spacers 1420. The sum of height $h_3$ and height $h_4$ may be greater than the sum of height $h_1$ and height $h_2$. Safeguard column spacers 1424 and safeguard photo spacers 1434 may restrict the lateral displacement of photo spacers and may lift safeguard photo spacers 1434 and increase the distance between top substrate 1440 and bottom substrate 1410, when the lateral displacement is larger than the lateral separation between a safeguard column spacer 1424 and the corresponding safeguard photo spacer 1434.

FIG. 14B illustrates an example of restricting lateral displacement of substrates in LCD cell 1400 of FIG. 14A according to certain embodiments. FIG. 14B shows that, when top substrate 1440 is laterally displaced (e.g., in the x direction) by a distance greater that the lateral separation between a safeguard CS 1424 and a corresponding safeguard PS 1434, safeguard PS 1434 may be lifted long the sidewall of safeguard CS 1424, thereby increasing the distance between top substrate 1440 and bottom substrate 1410.

Figure 15:
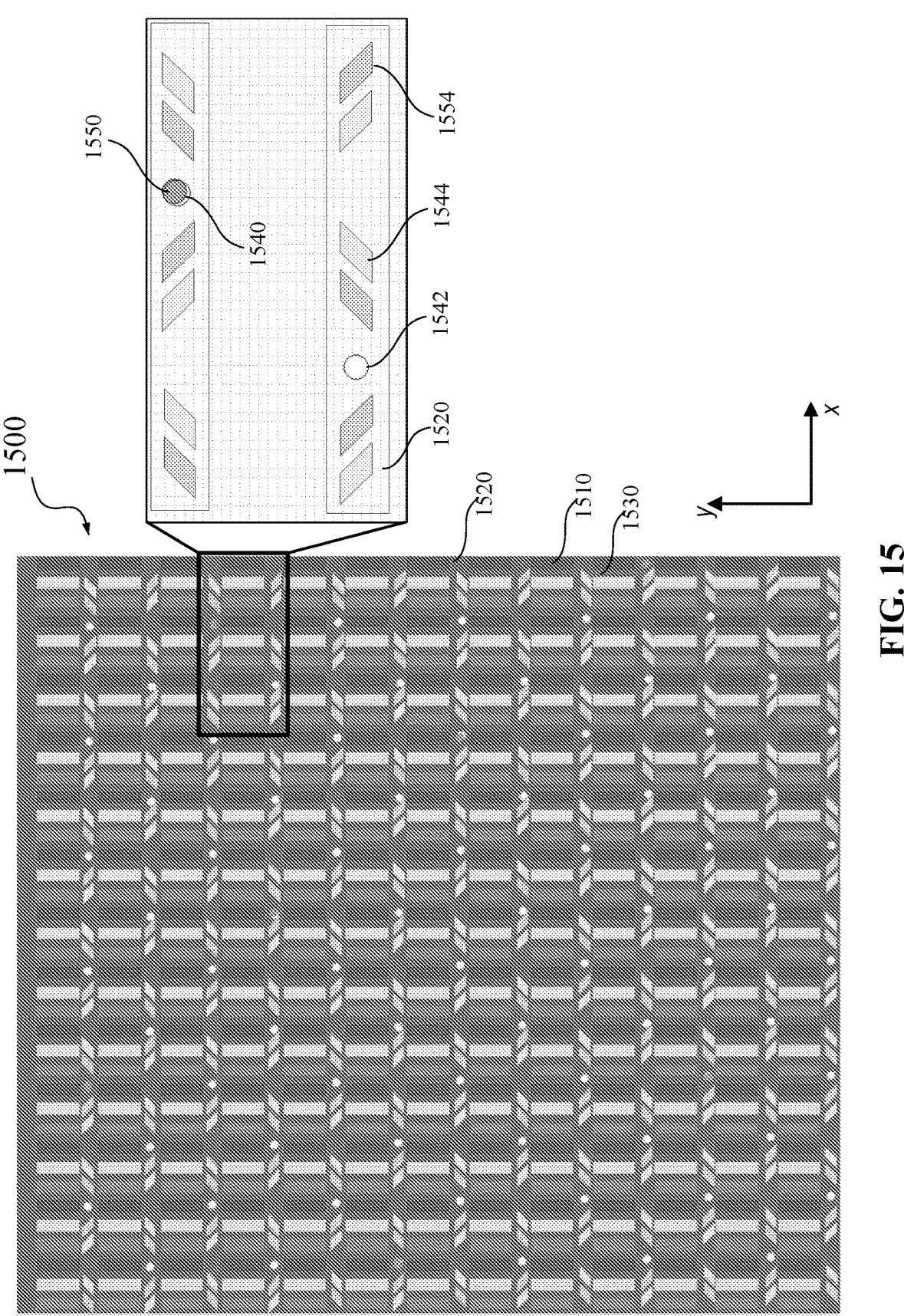
FIG. 15 illustrates an example of an LCD panel including different types of photo spacers and/or different types of column spacers according to certain embodiments.

FIG. 15 illustrates an example of an LCD panel 1500 including different types of photo spacers and/or different types of column spacers according to certain embodiments. FIG. 15 shows a two-dimensional array of color pixels 1510, a plurality of backplane electrodes 1520, and a black matrix 1530 in LCD panel 1500. Backplane electrodes 1520 may include gate electrodes that each extend in the x direction and are arranged along the y directions, and source electrodes that each extend in the y direction and are arranged along the x directions. FIG. 15 also shows different types of photo spacers and different types of column spacers on backplane electrodes 1520 (e.g., gate electrodes). As described above with respect to FIG. 14, the different types of column spacers may include main column spacers 1540, sub-column spacers 1542, and safeguard column spacers 1544. The different types of photo spacers may include main photo spacers 1550 and safeguard photo spacers 1554. In the illustrated example, main column spacers 1540, main photo spacers 1550, and sub-column spacers 1542 may have circular cross-sections, whereas safeguard column spacers 1544 and safeguard photo spacers 1554 may have cross-sections in the shape of a parallelogram.

The different types of photo spacers and the different types of column spacers may be arranged according certain patterns or may be arranged randomly. The number of main column spacers, the number of sub-column spacers, and the number of safeguard column spacers may be selected based on certain ratios. For example, there may be more safeguard column spacers than sub-column spacers, and there may be fewer main column spacers than sub-column spacers. In some embodiments, there may be one pair of a safeguard photo spacer and a safeguard column spacer on each side of a main CS or a sub-CS in the x direction. The pairs on opposite sides of a main CS or sub-CS may be slanted in opposite directions in the x-y plane. It is noted that the specific arrangement of the different types of photo spacers and the different types of column spacers in FIG. 15 is for illustration purposes only, and there may be many different variations of the arrangement of the different types of photo spacers and the different types of column spacers in different embodiments.

Figure 16:
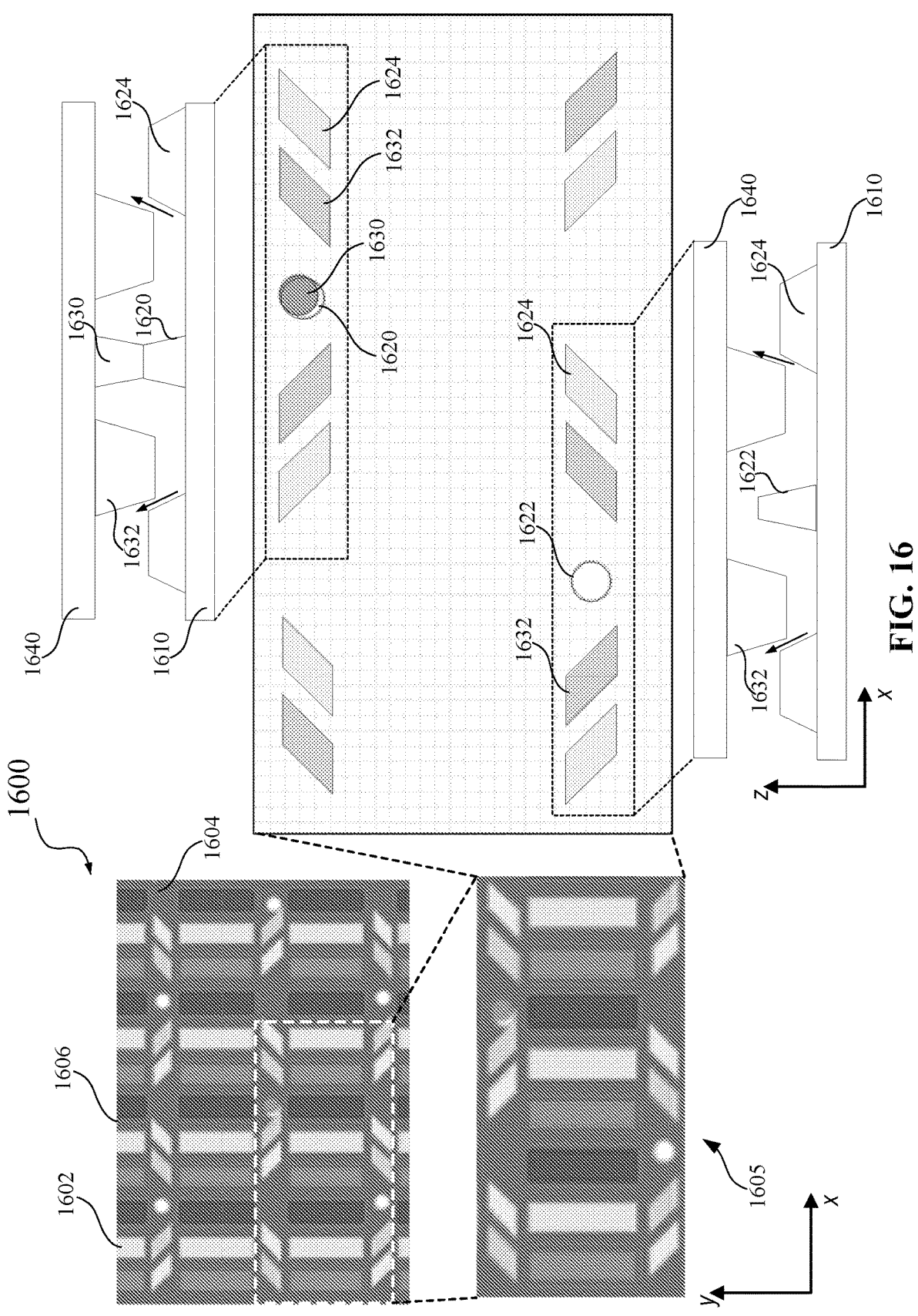
FIG. 16 illustrates an example of an arrangement of different types of photo spacers and/or different types of column spacers in an LCD panel according to certain embodiments.

FIG. 16 illustrates an example of an arrangement of different types of photo spacers and different types of column spacers in an LCD panel 1600 according to certain embodiments. LCD panel 1600 may be similar to LCD panel 1500, and may include a bottom substrate 1610, a top substrate 1640, and various types of photo spacers and column spacers. FIG. 16 shows a portion of LCD panel 1600 that includes a two-dimensional array of color pixels 1602, an array of backplane electrode 1604 (e.g., including gate electrodes and source electrodes), and a black matrix 1606.

FIG. 16 also shows the cross-sections of an area 1605 of LCD panel 1600. Area 1605 may include a region including a main CS 1620 and a pair of safeguard column spacers 1624 on opposite sides of main CS 1620 and slanted in opposite directions, and a main PS 1630 and a pair of safeguard photo spacers 1632 on opposite sides of main PS 1630 and slanted in opposite directions. Area 1605 may also include a region including a sub-CS 1622 and a pair of safeguard column spacers 1624 on opposite sides of sub-CS 1622 and slanted in opposite directions, and a pair of safeguard photo spacers 1632 on opposite sides of sub-CS 1622 and slanted in opposite directions.

When a force is applied to LCD panel 1600 such that there may be a potential lateral displacement, safeguard photo spacers 1632 may be pushed against corresponding safeguard column spacers 1624, and thus safeguard photo spacers 1632 may be lifted in the z direction and may slide in the −y direction and +y direction with respect to the corresponding safeguard column spacers 1624, due to the opposite slant directions of the spacers on opposite sides of the main column spacer or the sub-column spacer. Therefore, the lateral displacement of the photo spacers in the ±y direction may be restricted and/or may be translated to shift in the +z direction to avoid LC cell damages and mura defects. Since the safeguard spacers are slanted and thus sliding the safeguard photo spacers in the x direction would also cause the sliding of the safeguard photo spacer in the y direction, restricting the relative displacement of the safeguard photo spacers in the ±y direction would also restrict the relative displacement of the safeguard photo spacer in the ±x direction. As such, the displacement of the top substrate and the photo spacers with respect to the bottom substrate may be restricted the both the ±x direction and the ±y direction.

Embodiments disclosed herein may be used to implement components of an artificial reality system or may be implemented in conjunction with an artificial reality system. Artificial reality is a form of reality that has been adjusted in some manner before presentation to a user, which may include, for example, a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

Figure 17:
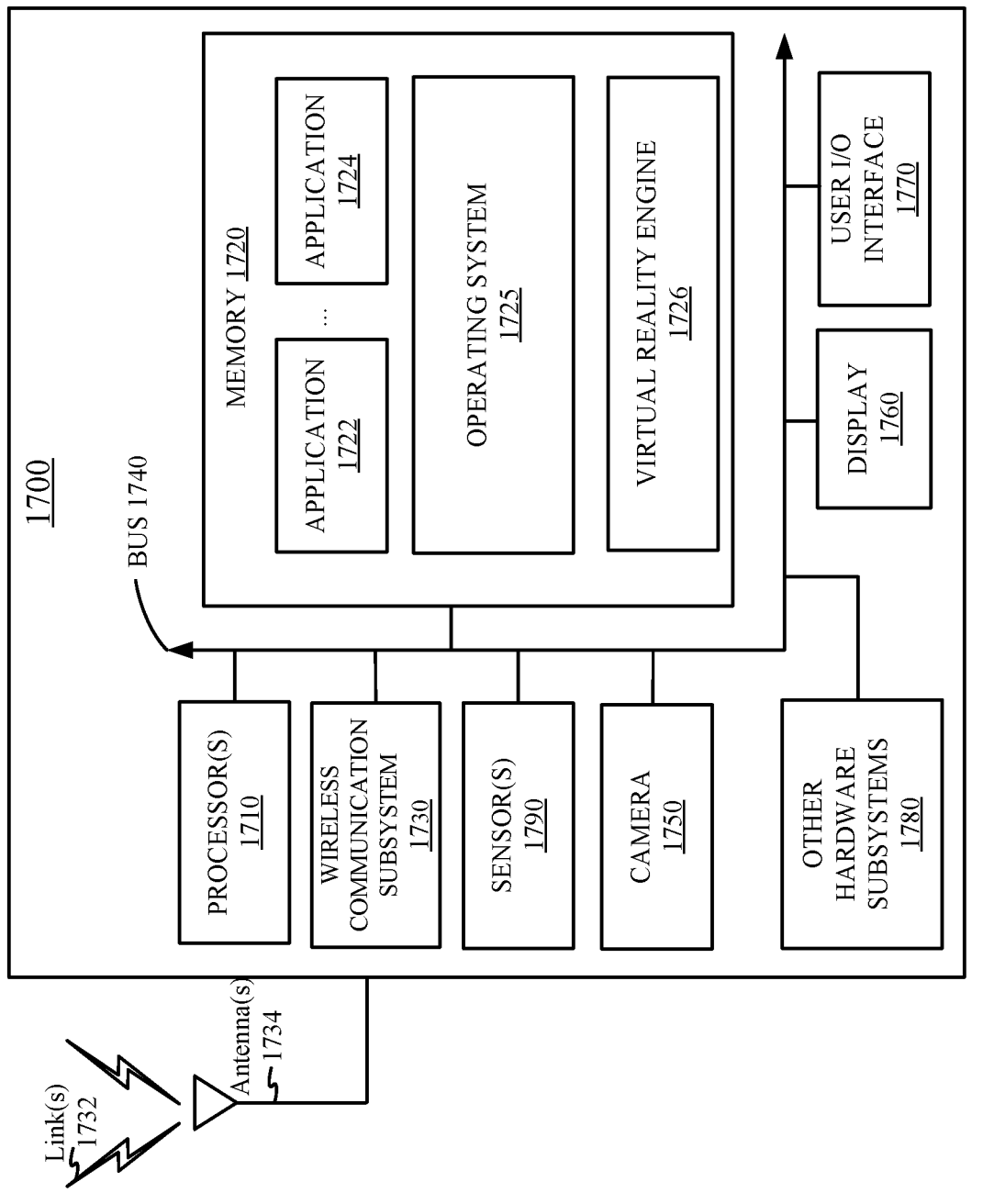
FIG. 17 illustrates an example of an electronic system of an example of a near-eye display for implementing some of the examples disclosed herein.

FIG. 17 is a simplified block diagram of an example of an electronic system 1700 of an example near-eye display (e.g., HMD device) for implementing some of the examples disclosed herein. Electronic system 1700 may be used as the electronic system of an HMD device or other near-eye displays described above. In this example, electronic system 1700 may include one or more processor(s) 1710 and a memory 1720. Processor(s) 1710 may be configured to execute instructions for performing operations at a number of components, and can be, for example, a general-purpose processor or microprocessor suitable for implementation within a portable electronic device. Processor(s) 1710 may be communicatively coupled with a plurality of components within electronic system 1700. To realize this communicative coupling, processor(s) 1710 may communicate with the other illustrated components across a bus 1740. Bus 1740 may be any subsystem adapted to transfer data within electronic system 1700. Bus 1740 may include a plurality of computer buses and additional circuitry to transfer data.

Memory 1720 may be coupled to processor(s) 1710. In some embodiments, memory 1720 may offer both short-term and long-term storage and may be divided into several units. Memory 1720 may be volatile, such as static random access memory (SRAM) and/or dynamic random access memory (DRAM) and/or non-volatile, such as read-only memory (ROM), flash memory, and the like. Furthermore, memory 1720 may include removable storage devices, such as secure digital (SD) cards. Memory 1720 may provide storage of computer-readable instructions, data structures, program code, and other data for electronic system 1700. In some embodiments, memory 1720 may be distributed into different hardware subsystems. A set of instructions and/or code might be stored on memory 1720. The instructions might take the form of executable code that may be executable by electronic system 1700, and/or might take the form of source and/or installable code, which, upon compilation and/or installation on electronic system 1700 (e.g., using any of a variety of generally available compilers, installation programs, compression/decompression utilities, etc.), may take the form of executable code.

In some embodiments, memory 1720 may store a plurality of applications 1722 through 1724, which may include any number of applications. Examples of applications may include gaming applications, conferencing applications, video playback applications, or other suitable applications. The applications may include a depth sensing function or eye tracking function. Applications 1722-1724 may include particular instructions to be executed by processor(s) 1710. In some embodiments, certain applications or parts of applications 1722-1724 may be executable by other hardware subsystems 1780. In certain embodiments, memory 1720 may additionally include secure memory, which may include additional security controls to prevent copying or other unauthorized access to secure information.

In some embodiments, memory 1720 may include an operating system 1725 loaded therein. Operating system 1725 may be operable to initiate the execution of the instructions provided by applications 1722-1724 and/or manage other hardware subsystems 1780 as well as interfaces with a wireless communication subsystem 1730 which may include one or more wireless transceivers. Operating system 1725 may be adapted to perform other operations across the components of electronic system 1700 including threading, resource management, data storage control and other similar functionality.

Wireless communication subsystem 1730 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1700 may include one or more antennas 1734 for wireless communication as part of wireless communication subsystem 1730 or as a separate component coupled to any portion of the system. Depending on desired functionality, wireless communication subsystem 1730 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1730 may permit data to be exchanged with a network, other computer systems, and/or any other devices described herein. Wireless communication subsystem 1730 may include a means for transmitting or receiving data, such as identifiers of HMD devices, position data, a geographic map, a heat map, photos, or videos, using antenna(s) 1734 and wireless link(s) 1732.

Embodiments of electronic system 1700 may also include one or more sensors 1790. Sensor(s) 1790 may include, for example, an image sensor, an accelerometer, a pressure sensor, a temperature sensor, a proximity sensor, a magnetometer, a gyroscope, an inertial sensor (e.g., a subsystem that combines an accelerometer and a gyroscope), an ambient light sensor, or any other similar devices or subsystems operable to provide sensory output and/or receive sensory input, such as a depth sensor or a position sensor. For example, in some implementations, sensor(s) 1790 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1700 may include a display 1760. Display 1760 may be a near-eye display, and may graphically present information, such as images, videos, and various instructions, from electronic system 1700 to a user. Such information may be derived from one or more applications 1722-1724, virtual reality engine 1726, one or more other hardware subsystems 1780, a combination thereof, or any other suitable means for resolving graphical content for the user (e.g., by operating system 1725). Display 1760 may use liquid crystal display (LCD) technology, light-emitting diode (LED) technology (including, for example, OLED, ILED, μLED, AMOLED, TOLED, etc.), light emitting polymer display (LPD) technology, or some other display technology.

Electronic system 1700 may include a user input/output interface 1770. User input/output interface 1770 may allow a user to send action requests to electronic system 1700. An action request may be a request to perform a particular action. For example, an action request may be to start or end an application or to perform a particular action within the application. User input/output interface 1770 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1700. In some embodiments, user input/output interface 1770 may provide haptic feedback to the user in accordance with instructions received from electronic system 1700. For example, the haptic feedback may be provided when an action request is received or has been performed.

Electronic system 1700 may include a camera 1750 that may be used to take photos or videos of a user, for example, for tracking the user's eye position. Camera 1750 may also be used to take photos or videos of the environment, for example, for VR, AR, or MR applications. Camera 1750 may include, for example, a complementary metal-oxide-semiconductor (CMOS) image sensor with a few millions or tens of millions of pixels. In some implementations, camera 1750 may include two or more cameras that may be used to capture 3-D images.

In some embodiments, electronic system 1700 may include a plurality of other hardware subsystems 1780. Each of other hardware subsystems 1780 may be a physical subsystem within electronic system 1700. While each of other hardware subsystems 1780 may be permanently configured as a structure, some of other hardware subsystems 1780 may be temporarily configured to perform specific functions or temporarily activated. Examples of other hardware subsystems 1780 may include, for example, an audio output and/or input interface (e.g., a microphone or speaker), a near field communication (NFC) device, a rechargeable battery, a battery management system, a wired/wireless battery charging system, etc. In some embodiments, one or more functions of other hardware subsystems 1780 may be implemented in software.

In some embodiments, memory 1720 of electronic system 1700 may also store a virtual reality engine 1726. Virtual reality engine 1726 may execute applications within electronic system 1700 and receive position information, acceleration information, velocity information, predicted future positions, or some combination thereof of the HMD device from the various sensors. In some embodiments, the information received by virtual reality engine 1726 may be used for producing a signal (e.g., display instructions) to display 1760. For example, if the received information indicates that the user has looked to the left, virtual reality engine 1726 may generate content for the HMD device that mirrors the user's movement in a virtual environment. Additionally, virtual reality engine 1726 may perform an action within an application in response to an action request received from user input/output interface 1770 and provide feedback to the user. The provided feedback may be visual, audible, or haptic feedback. In some implementations, processor(s) 1710 may include one or more GPUs that may execute virtual reality engine 1726.

In various implementations, the above-described hardware and subsystems may be implemented on a single device or on multiple devices that can communicate with one another using wired or wireless connections. For example, in some implementations, some components or subsystems, such as GPUs, virtual reality engine 1726, and applications (e.g., tracking application), may be implemented on a console separate from the head-mounted display device. In some implementations, one console may be connected to or support more than one HMD.

In alternative configurations, different and/or additional components may be included in electronic system 1700. Similarly, functionality of one or more of the components can be distributed among the components in a manner different from the manner described above. For example, in some embodiments, electronic system 1700 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and" and "or," as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any combination of A, B, and/or C, such as AB, AC, BC, AA, ABC, AAB, AABBCCC, or the like.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

In view of this description embodiments may include different combinations of features. Implementation examples are described in the following numbered clauses:

Clause 1. A liquid crystal display (LCD) cell comprising:
  a first substrate;
  a second substrate;
  a plurality of photo spacers formed on the second substrate;
  a plurality of column spacers formed on the first substrate, each column spacer of the plurality of column spacers including two parts that form a recess for receiving a respective photo spacer of the plurality of photo spacers; and
  a liquid crystal material in regions between the first substrate and the second substrate.

Clause 2. The LCD cell of Clause 1, wherein at least a portion of a sidewall of the recess is tilted outwardly to receive the respective photo spacer.

Clause 3. The LCD cell of Clause 1 or 2, wherein the respective photo spacer is tapered in the recess.

Clause 4. The LCD cell of any of Clauses 1-3, wherein the respective photo spacer includes a rounded surface in the recess.

Clause 5. The LCD cell of any of Clauses 1-4, wherein a cross-section of the respective photo spacer is characterized by a shape of a circle, an oval, a rectangle, or a parallelogram.

Clause 6. The LCD cell of any of Clauses 1-5, wherein the plurality of column spacers includes a two-dimensional array of column spacers.

Clause 7. The LCD cell of any of Clauses 1-6, wherein:
the two parts of each column spacer of the plurality of column spacers are positioned along a first direction; and
a gap between the two parts of each column spacer of the plurality of column spacers is slanted with respect to the first direction in a plane parallel to the first substrate.

Clause 8. The LCD cell of Clause 7, wherein the plurality of column spacers comprises:
a first set of column spacers, the gap between the two parts of each column spacer of the first set of column spacers is slanted in a second direction with respect to the first direction in the plane parallel to the first substrate; and
a second set of column spacers, the gap between the two parts of each column spacer of the second set of column spacers is slanted in a third direction with respect to the first direction in the plane parallel to the first substrate, wherein the third direction is different from the second direction.

Clause 9. The LCD cell of any of Clauses 1-6, wherein the plurality of column spacers comprises:
a first set of column spacers, each column spacer of the first set of column spacers including two parts positioned along a first direction; and
a second set of column spacers, each column spacer of the second set of column spacers including two parts positioned along a second direction perpendicular to the first direction.

Clause 10. The LCD cell of any of Clauses 1-9, wherein the first substrate comprises:
a transparent substate; and
thin-film transistor circuits formed on the transparent substrate.

Clause 11. The LCD cell of Clause 10, wherein the first substrate further comprises an array of color filters on the thin-film transistor circuits.

Clause 12. The LCD cell of Clause 10, wherein:
the thin-film transistor circuits comprising an array of gate electrodes; and
the plurality of column spacers is formed on the array of gate electrodes.

Clause 13. The LCD cell of any of Clauses 1-12, wherein the second substrate comprises:
a transparent substate;
a black matrix formed on the transparent substrate; and
a transparent conductive layer or overcoat layer on the black matrix.

Clause 14. The LCD cell of Clause 13, wherein the second substrate further comprises an array of color filters.

Clause 15. The LCD cell of any of Clauses 1-14, wherein a width of the respective photo spacer is less than 10 μm.

Clause 16. A liquid crystal display (LCD) cell comprising:
a first substrate;
a second substrate;
a plurality of column spacers formed on the first substrate;
a plurality of photo spacers formed on the second substrate, each photo spacer of the plurality of photo spacers including two parts that form a recess for receiving a respective column spacer of the plurality of column spacers; and
a liquid crystal material in regions between the first substrate and the second substrate.

Clause 17. The LCD cell of Clause 16, wherein at least a portion of a sidewall of the recess is tilted outwardly to receive the respective column spacer.

Clause 18. The LCD cell of Clause 16 or 17, wherein a cross-section of the respective column spacer is characterized by a shape of a circle, an oval, a rectangle, or a parallelogram.

Clause 19. The LCD cell of any of Clauses 16-18, wherein:
the two parts of each photo spacer of the plurality of photo spacers are positioned along a first direction; and
a gap between the two parts of each photo spacer of the plurality of photo spacers is slanted with respect to the first direction in a plane parallel to the second substrate.

Clause 20. The LCD cell of Clause 19, wherein the plurality of photo spacers comprises:
a first set of photo spacers, the gap between the two parts of each photo spacer of the first set of photo spacers is slanted in a second direction with respect to the first direction in the plane parallel to the second substrate; and
a second set of photo spacers, the gap between the two parts of each photo spacer of the second set of photo spacers is slanted in a third direction with respect to the first direction in the plane parallel to the second substrate, wherein the third direction is different from the second direction.

Clause 21. The LCD cell of any of Clauses 16-20, wherein the plurality of photo spacers comprises:
a first set of photo spacers, each photo spacer of the first set of photo spacers including two parts positioned along a first direction; and
a second set of photo spacers, each photo spacer of the second set of photo spacers including two parts positioned along a second direction perpendicular to the first direction.

Clause 22. A liquid crystal display (LCD) cell comprising:
a first substrate;
a second substrate;
a plurality of photo spacers formed on the second substrate;
a plurality of column spacers formed on the first substrate, the plurality of column spacers comprising a first set of column spacers characterized by a first height, and at least one of:
a second set of column spacers characterized by a second height equal to or greater than the first height; or
a third set of column spacers characterized by a third height equal to or lower than the first height; and
a liquid crystal material in regions between the first substrate and the second substrate.

Clause 23. The LCD cell of Clause 22, wherein the plurality of photo spacers comprises a first set of photo spacers in physical contact with the first set of column spacers.

Clause 24. The LCD cell of Clause 23, wherein each photo spacer of the first set of photo spacers and a respective column spacer of the first set of column spacers are in physical contact and are tapered in opposite directions.

Clause 25. The LCD cell of Clause 23 or 24, wherein each photo spacer of the first set of photo spacers is characterized by a cross-sectional shape of a circle, an oval, or a polygon.

Clause 26. The LCD cell of any of Clauses 23-25, wherein the plurality of photo spacers comprises a second set of photo spacers, each photo spacer of the second set of photo spacers adjacent to a respective column spacer of the third set of column spacers and characterized by a height greater than a height of the first set of photo spacers.

Clause 27. The LCD cell of Clause 26, wherein the plurality of photo spacers comprises a pair of photo spacers of the second set of photo spacers on opposite sides of each photo spacer of the first set of photo spacers, the pair of photo spacers slanted with each other in a plane parallel to the second substrate.

Clause 28. The LCD cell of Clause 26, wherein the plurality of photo spacers comprises a pair of photo spacers of the second set of photo spacers on opposite sides of each column spacer of the second set of column spacers, the pair of photo spacers slanted with each other in a plane parallel to the second substrate.

Clause 29. The LCD cell of Clause 26, wherein each photo spacer of the second set of photo spacers and the respective column spacer of the third set of column spacers are tapered in opposite directions.

Clause 30. The LCD cell of Clause 26, wherein, in a plane parallel to the first substrate, a gap between each photo spacer of the second set of photo spacers and the respective column spacer of the third set of column spacers is slanted with respect to a line between centers of the photo spacer of the second set of photo spacers and the respective column spacer of the third set of column spacers.

Clause 31. The LCD cell of Clause 26, wherein each photo spacers of the second set of photo spacers is characterized by a cross-sectional shape of a parallelogram.

Clause 32. The LCD cell of any of Clauses 22-31, wherein each column spacers of the third set of column spacers is characterized by a cross-sectional shape of a parallelogram.

Clause 33. The LCD cell of any of Clauses 22-32, wherein each column spacers of the first set of column spacers and the second set of column spacers is characterized by a cross-sectional shape of a circle, an oval, or a polygon.

Clause 34. The LCD cell of any of Clauses 22-33, wherein the plurality of column spacers includes a pair of column spacers of the third set of column spacers on opposite sides of each column spacer of the first set of column spacers, the pair of column spacers slanted with each other in a plane parallel to the first substrate.

Clause 35. The LCD cell of any of Clauses 22-34, wherein the plurality of column spacers includes a pair of column spacers of the third set of column spacers on opposite sides of each column spacer of the second set of column spacers, the pair of column spacers slanted with each other in a plane parallel to the first substrate.

Clause 36. A liquid crystal display comprising:
a backlight unit configured to emit visible light;
a first polarizer configured to polarize the visible light from the backlight unit;
the LCD cell of any of Clauses 1-35, the LCD cell configured to modulate the polarized visible light; and
a second polarizer configured to filter the visible light modulated by the LCD cell.

Clause 37. A near-eye display comprising:
a liquid crystal display (LCD) of Clause 36, the LCD configured to generate images; and
display optics configured to project the images generated by the LCD to a user's eye.

What is claimed is:

1. A liquid crystal display (LCD) cell comprising:
a first substrate;
a second substrate;
a plurality of photo spacers formed on the second substrate; and
a plurality of column spacers formed on the first substrate, wherein:
each column spacer of the plurality of column spacers including two parts that form a recess for receiving a respective photo spacer of the plurality of photo spacers, and
at least one of the plurality column spacers is arranged according to a first orientation and at least an additional one of the plurality of column spacers is arranged according to a second orientation, the second orientation varying from the first orientation.

2. The LCD cell of claim 1, wherein at least a portion of a sidewall of the recess is tilted outwardly to receive the respective photo spacer.

3. The LCD cell of claim 1, wherein the respective photo spacer is tapered in the recess.

4. The LCD cell of claim 1, wherein the respective photo spacer includes a rounded surface in the recess.

5. The LCD cell of claim 1, wherein a cross-section of the respective photo spacer is characterized by a shape of a circle, an oval, a rectangle, or a parallelogram.

6. The LCD cell of claim 1, wherein the plurality of column spacers includes a two-dimensional array of column spacers.

7. The LCD cell of claim 1, wherein:
the two parts of each column spacer of the plurality of column spacers are positioned along a first direction; and
a gap between the two parts of each column spacer of the plurality of column spacers is slanted with respect to the first direction in a plane parallel to the first substrate.

8. The LCD cell of claim 7, wherein the plurality of column spacers comprises:
a first set of column spacers, the gap between the two parts of each column spacer of the first set of column spacers is slanted in a second direction with respect to the first direction in the plane parallel to the first substrate; and
a second set of column spacers, the gap between the two parts of each column spacer of the second set of column spacers is slanted in a third direction with respect to the first direction in the plane parallel to the first substrate, wherein the third direction is different from the second direction.

9. The LCD cell of claim 1, wherein the plurality of column spacers comprises:
a first set of column spacers, each column spacer of the first set of column spacers including two parts positioned along a first direction; and
a second set of column spacers, each column spacer of the second set of column spacers including two parts positioned along a second direction perpendicular to the first direction.

10. The LCD cell of claim 1, wherein the first substrate comprises:

a transparent substate; and thin-film transistor circuits formed on the transparent substrate.

11. The LCD cell of claim 10, wherein the first substrate further comprises an array of color filters on the thin-film transistor circuits.

12. The LCD cell of claim 10, wherein:

the thin-film transistor circuits comprising an array of gate electrodes; and the plurality of column spacers is formed on the array of gate electrodes.

13. The LCD cell of claim 1, wherein the second substrate comprises:

a transparent substate;

a black matrix formed on the transparent substrate; and a transparent conductive layer or overcoat layer on the black matrix.

14. The LCD cell of claim 13, wherein the second substrate further comprises an array of color filters.

15. The LCD cell of claim 1, wherein a width of the respective photo spacer is less than 10 μm.

16. A liquid crystal display (LCD) cell comprising:

a first substrate;

a second substrate;

a plurality of column spacers formed on the first substrate, wherein at least one of the plurality of column spacers is arranged according to a first orientation and at least an additional one of the plurality of column spacers is arranged according to a second orientation, the second orientation varying from the first orientation;

a plurality of photo spacers formed on the second substrate, each photo spacer of the plurality of photo spacers including two parts that form a recess for receiving a respective column spacer of the plurality of column spacers.

17. The LCD cell of claim 16, wherein at least a portion of a sidewall of the recess is tilted outwardly to receive the respective column spacer.

18. The LCD cell of claim 16, wherein:

the two parts of each photo spacer of the plurality of photo spacers are positioned along a first direction; and a gap between the two parts of each photo spacer of the plurality of photo spacers is slanted with respect to the first direction in a plane parallel to the second substrate.

19. The LCD cell of claim 18, wherein the plurality of photo spacers comprises:

a first set of photo spacers, the gap between the two parts of each photo spacer of the first set of photo spacers is slanted in a second direction with respect to the first direction in the plane parallel to the second substrate; and a second set of photo spacers, the gap between the two parts of each photo spacer of the second set of photo spacers is slanted in a third direction with respect to the first direction in the plane parallel to the second substrate, wherein the third direction is different from the second direction.

20. The LCD cell of claim 16, wherein the plurality of photo spacers comprises:

a first set of photo spacers, each photo spacer of the first set of photo spacers including two parts positioned along a first direction; and a second set of photo spacers, each photo spacer of the second set of photo spacers including two parts positioned along a second direction perpendicular to the first direction.

* * * * *